US010632938B2

(12) United States Patent
Tamura et al.

(10) Patent No.: US 10,632,938 B2
(45) Date of Patent: Apr. 28, 2020

(54) IN-WHEEL MOTOR POWER LINE WIRING STRUCTURE AND IN-WHEEL MOTOR DRIVE DEVICE

(71) Applicant: NTN CORPORATION, Osaka (JP)

(72) Inventors: Shiro Tamura, Shizuoka (JP); Yusuke Shibuya, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/090,283

(22) PCT Filed: Mar. 9, 2017

(86) PCT No.: PCT/JP2017/009520
§ 371 (c)(1),
(2) Date: Oct. 1, 2018

(87) PCT Pub. No.: WO2017/175537
PCT Pub. Date: Oct. 12, 2017

(65) Prior Publication Data
US 2019/0111865 A1 Apr. 18, 2019

(30) Foreign Application Priority Data
Apr. 6, 2016 (JP) .................................. 2016-076684

(51) Int. Cl.
B60G 13/00 (2006.01)
B60G 3/28 (2006.01)
(Continued)

(52) U.S. Cl.
CPC .......... *B60R 16/0207* (2013.01); *B60G 7/001* (2013.01); *B60G 13/00* (2013.01);
(Continued)

(58) Field of Classification Search
CPC .... B60R 16/0207; B60G 7/001; B60G 13/00; B60G 3/28; B60G 11/16; B60K 1/04;
(Continued)

(56) References Cited

U.S. PATENT DOCUMENTS 5,087,229 A * 2/1992 Hewko ................ B60K 7/0007
180/65.51
5,150,763 A 9/1992 Yamashita et al.
(Continued)

FOREIGN PATENT DOCUMENTS

EP 1 362 736 11/2003
JP 2005-047306 2/2005
(Continued)

*Primary Examiner* — Bryan A Evans
(74) *Attorney, Agent, or Firm* — Clark & Brody LP

(57) ABSTRACT

An in-wheel motor power line wiring structure of the present invention includes an in-wheel motor drive device configured to drive a wheel, a damper (77) including an upper end portion (77b) and a lower end portion (77c), the upper end portion (77b) being coupled to a vehicle-body-side member and the lower end portion (77c) being coupled to the in-wheel motor drive device, a power line extending from the in-wheel motor drive device to a vehicle body, and a clamp member (96) that is provided on the lower end portion of the damper and configured to hold an intermediate portion of the power line.

12 Claims, 26 Drawing Sheets

(51) Int. Cl.
*B60G 11/16* (2006.01)
*B60K 1/04* (2019.01)
*B60K 7/00* (2006.01)
*B62D 9/00* (2006.01)
*B60R 16/02* (2006.01)
*B60G 7/00* (2006.01)
*B60K 17/04* (2006.01)

(52) U.S. Cl.
CPC .............. *B60K 7/0007* (2013.01); *B62D 9/00* (2013.01); *B60K 17/043* (2013.01); *B60K 2007/0038* (2013.01); *B60K 2007/0061* (2013.01)

(58) Field of Classification Search
CPC ...... B60K 7/00; B60K 7/0007; B60K 17/043; B60K 17/046; B60K 2007/0038; B60K 2007/0061; B60K 2007/0092; B62D 9/00; H02K 5/22; B60L 2220/44
See application file for complete search history.

(56) References Cited

U.S. PATENT DOCUMENTS

| | | | | |
|---|---|---|---|---|
| 6,039,324 A | * | 3/2000 | Santa, Jr. ............. | H02G 15/013 174/92 |
| 2007/0234559 A1 | * | 10/2007 | Tokuda ................ | B60K 7/0007 29/755 |
| 2018/0272855 A1 | * | 9/2018 | Tamura ............... | B60B 27/0026 |

FOREIGN PATENT DOCUMENTS

| | | | |
|---|---|---|---|
| JP | 2005047306 A | * | 2/2005 |
| JP | 2005-132174 | | 5/2005 |
| JP | 2008-308033 | | 12/2008 |
| JP | 2008308033 A | * | 12/2008 |
| JP | 4511976 | | 7/2010 |
| JP | 2015-013528 | | 1/2015 |
| JP | 2015-160498 | | 9/2015 |
| JP | 2016-001041 | | 1/2016 |
| JP | 2016-032962 | | 3/2016 |
| WO | 2016/043065 | | 3/2016 |

* cited by examiner

OUTSIDE IN VEHICLE WIDTH DIRECTION
←

UPPER DIRECTION ↑

OUTSIDE IN VEHICLE WIDTH DIRECTION →

OUTSIDE IN VEHICLE WIDTH DIRECTION ←     FRONT OF VEHICLE ↓

IN-WHEEL MOTOR POWER LINE WIRING STRUCTURE AND IN-WHEEL MOTOR DRIVE DEVICE

TECHNICAL FIELD

The present invention relates to a power line that extends from an in-wheel motor drive device to a vehicle body and supplies electric power from the vehicle body to the in-wheel motor drive device.

BACKGROUND ART

There is conventionally known a technique of providing an in-wheel motor within a wheel of an electric vehicle to drive the wheel with the in-wheel motor. In such an electric vehicle, an engine and an electric motor need not be mounted on a vehicle body, so that it is advantageous that an inner space of the vehicle body, such as a living room space or a baggage room space, is made larger. The in-wheel motor is coupled to the vehicle body of the electric vehicle through a suspension device. On the vehicle body, a controller of the in-wheel motor, a battery, and an inverter are mounted. The in-wheel motor that is coupled to an unsprung part (a wheel side) of the suspension device and the inverter that is mounted on a sprung part (a vehicle-body side) of the suspension device are connected to each other with the power line. As the power line for supplying electric power from the inverter to the in-wheel motor, for example, a structure disclosed in JP 4511976 B2 (Patent Literature 1) is conventionally known.

Through operation of the suspension device, the in-wheel motor is displaced in a vertical direction or steered in a lateral direction with respect to the vehicle body. Hence, an intermediate portion of the power line needs to be appropriately supported such that an excessive bend is not generated on the power line. According to a power line wiring structure disclosed in the patent literature, the intermediate portion of the power line is attached to an end surface of the in-wheel motor with a clamp member. A plurality of fins are provided to stand on a surface of the in-wheel motor disclosed in the patent literature.

CITATION LIST

Patent Literature

Patent Literature 1: JP 4511976 B2

SUMMARY OF INVENTION

Technical Problem

An inventor of the present invention has found matters that need to be further improved in the conventional wiring structure described above. Since the clamp member is attached to the surface of the in-wheel motor, no fin can be provided at a portion where the clamp member is attached. Hence, a sufficient number of cooling fins cannot be provided on the in-wheel motor.

In view of the above circumstances, it is an object of the present invention to provide a wiring structure that is capable of supporting an intermediate portion of a power line without providing a clamp member on a surface of an in-wheel motor.

Solution to Problem

In order to achieve the above object, an in-wheel motor power line wiring structure of the present invention includes: an in-wheel motor drive device configured to drive a wheel; a damper including an upper end portion and a lower end portion, the upper end portion being coupled to a vehicle-body-side member, the lower end portion being coupled to the in-wheel motor drive device; a power line extending from the in-wheel motor drive device to a vehicle body; and a clamp member that is provided on the lower end portion of the damper and configured to hold an intermediate portion of the power line.

According to the present invention, since the clamp member configured to hold the intermediate portion of the power line is disposed to be isolated from the in-wheel motor drive device, a sufficient number of the cooling fins can be provided on a surface of the in-wheel motor drive device.

According to an embodiment of the present invention, the damper is included in a strut that extends in a vertical direction and that is elastic in the vertical direction, the damper being configured to attenuate expansion and contraction of the strut. As another embodiment, the in-wheel motor drive device may be coupled to a vehicle body member with a combination of the damper and a suspension arm.

As a preferable embodiment of the present invention, the in-wheel motor drive device is steerable around a steering axis that extends in the vertical direction to intersect an upper end portion of the strut. As another embodiment, the in-wheel motor drive device may drive a not-turning wheel not to be steered.

As a further preferable embodiment of the present invention, the clamp member includes an elastic member surrounding an outer periphery of the power line. According to the above embodiment, the clamp member permits a twist and a little displacement of the power line to relieve a bend that is applied to the power line. As another embodiment, the intermediate portion of the power line may be surrounded with a metallic member that is formed into an O shape or a C shape.

As an embodiment of the present invention, the elastic member is a block having a plurality of through holes through which a plurality of the power lines are respectively passed. According to the above embodiment, the plurality of the power lines can be neatly arranged. As another embodiment, the plurality of the power lines may be passed through one through hole.

As an embodiment of the present invention, the clamp member includes a pair of base members configured to hold the lower end portion of the damper, and a metallic wall member including a pair of end wall portions opposed to each other in a horizontal direction, and an intermediate wall portion extending in the horizontal direction from one of the end wall portions to another of the end wall portions such that the pair of end wall portions are attached to the base member and restrain the elastic member so as to hold side surfaces of the elastic member. According to the above embodiment, the power line is restricted from moving in the horizontal direction.

As an embodiment of the present invention, the clamp member is disposed to be superimposed on a wheel rim of the wheel as seen in an axle direction of the wheel. According to the above embodiment, the power line can be prevented from bending and interfering with the wheel. As another embodiment, the clamp member may be disposed to be apart from the wheel rim of the wheel as seen in the axle direction of the wheel.

As an embodiment of the present invention, the clamp member is disposed to be superimposed on the steering axis as seen in the axle direction of the wheel. According to the above embodiment, the bend of the power line can be reduced when the in-wheel motor drive device is steered. As another embodiment, the clamp member is disposed to shift from the wheel rim of the wheel in a vehicle front-rear direction as seen in the axle direction of the wheel.

As an embodiment of the present invention, the lower end portion of the damper includes a shaft portion and a damper bracket that is fixedly attached to the shaft portion to extend downward from the shaft portion and that includes an in-wheel motor coupling portion for being coupled to the in-wheel motor drive device, and the clamp member is provided on the shaft portion. As another embodiment, the clamp member may be provided on the damper bracket.

As an embodiment of the present invention, the power line includes a first region that extends in the vertical direction to be connected to a side of the in-wheel motor drive device at a lower portion and to be connected to the vehicle-body side at an upper portion, and a second region that extends in the vertical direction to be connected to the side of the in-wheel motor drive device at an upper portion and to be connected to the vehicle-body side at a lower portion, and the clamp member holds the first region and the second region. According to the above embodiment, the power line can be wired so as to turn around along the lower end portion of the damper.

As an embodiment of the present invention, a plurality of the in-wheel motor drive devices, a plurality of the dampers, a plurality of the power lines, and a plurality of the clamp members are respectively disposed on both sides of the vehicle body in the vehicle width direction, the in-wheel motor power line wiring structure further includes: a stabilizer that extends from one side to another side of the vehicle body in the vehicle width direction; and a pair of stabilizer links that are respectively disposed on both sides of the vehicle body in the vehicle width direction, and one end of each of the stabilizer links is coupled to an end of the stabilizer and another end of each of the stabilizer links is coupled to the clamp member. According to the above embodiment, parts for coupling the stabilizer link to the lower end portion of the damper can be reduced. As another embodiment, the other end of the stabilizer link may be coupled to the lower end portion of the damper to be separated from the clamp member.

As the present invention, also, an in-wheel motor drive device including an in-wheel motor power line can be implemented. That is, an in-wheel motor drive device of the present invention includes a wheel hub that is coupled to a wheel, a motor unit including a motor rotation shaft that drives the wheel hub, a casing that forms an outer shell, and a power line connecting portion that is provided on the casing, and a flexible power line whose one end is connected to the power line connecting portion, whose the other end extends to a vehicle body outside the casing, and that supplies electric power from the vehicle body to the motor unit. The in-wheel motor drive device is coupled to a lower end portion of a damper extending in a vertical direction. An intermediate portion of the power line is held by a clamp member that is provided on the lower end portion of the damper.

According to the present invention, since the clamp member configured to hold the intermediate portion of the power line is provided on the lower end portion of the damper instead of the in-wheel motor drive device, a sufficient number of cooling fins can be provided on a surface of the in-wheel motor drive device.

Advantageous Effects of Invention

According to the present invention, a sufficient number of cooling fins can be provided on the surface of the in-wheel motor drive device. Therefore, cooling effect of the in-wheel motor drive device can be improved.

DESCRIPTION OF EMBODIMENTS

Figure 1:
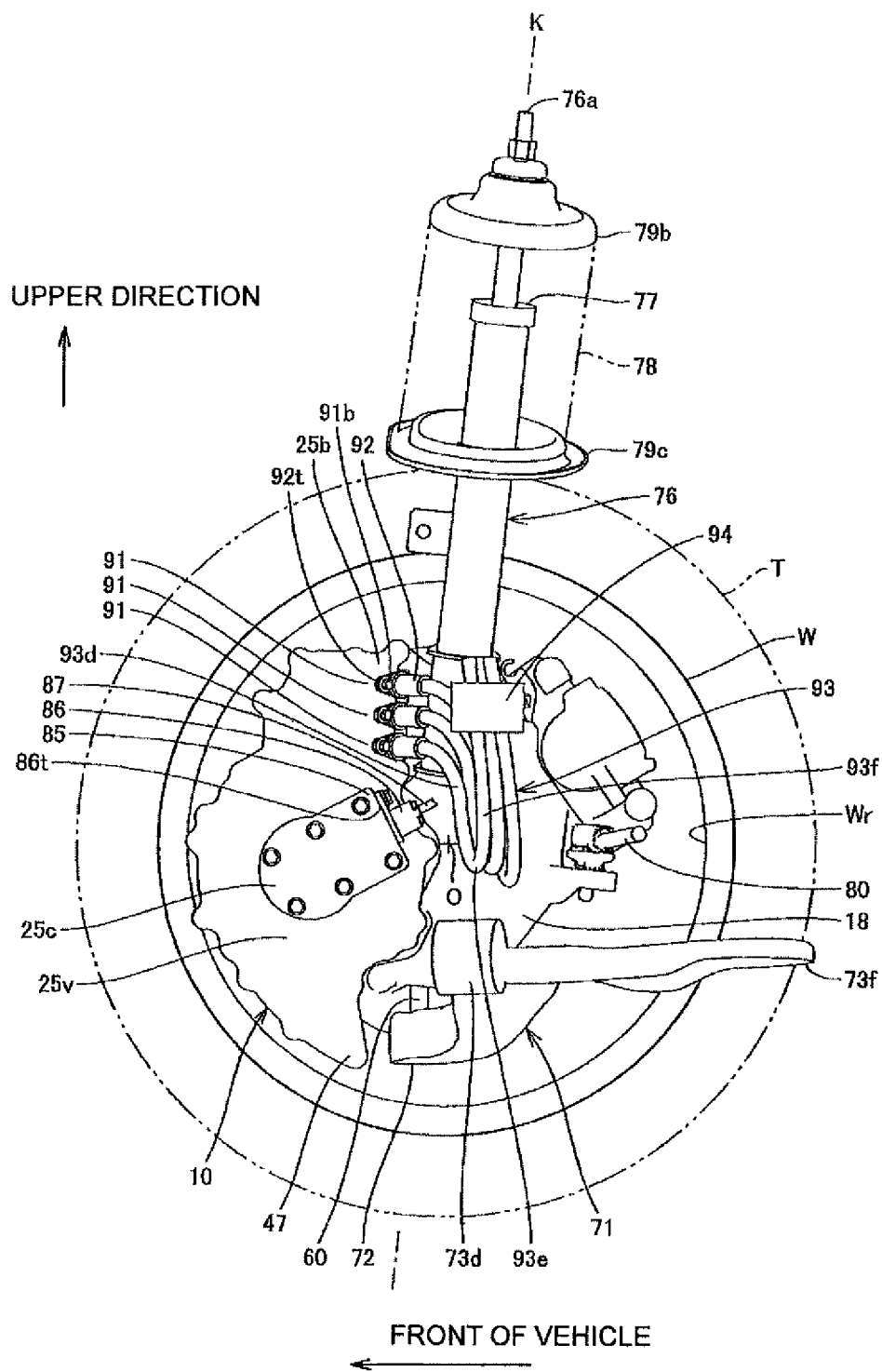
FIG. 1 is a schematic view illustrating an in-wheel motor power line wiring structure of a reference example in a state seen from inside in a vehicle width direction.
Figure 2:
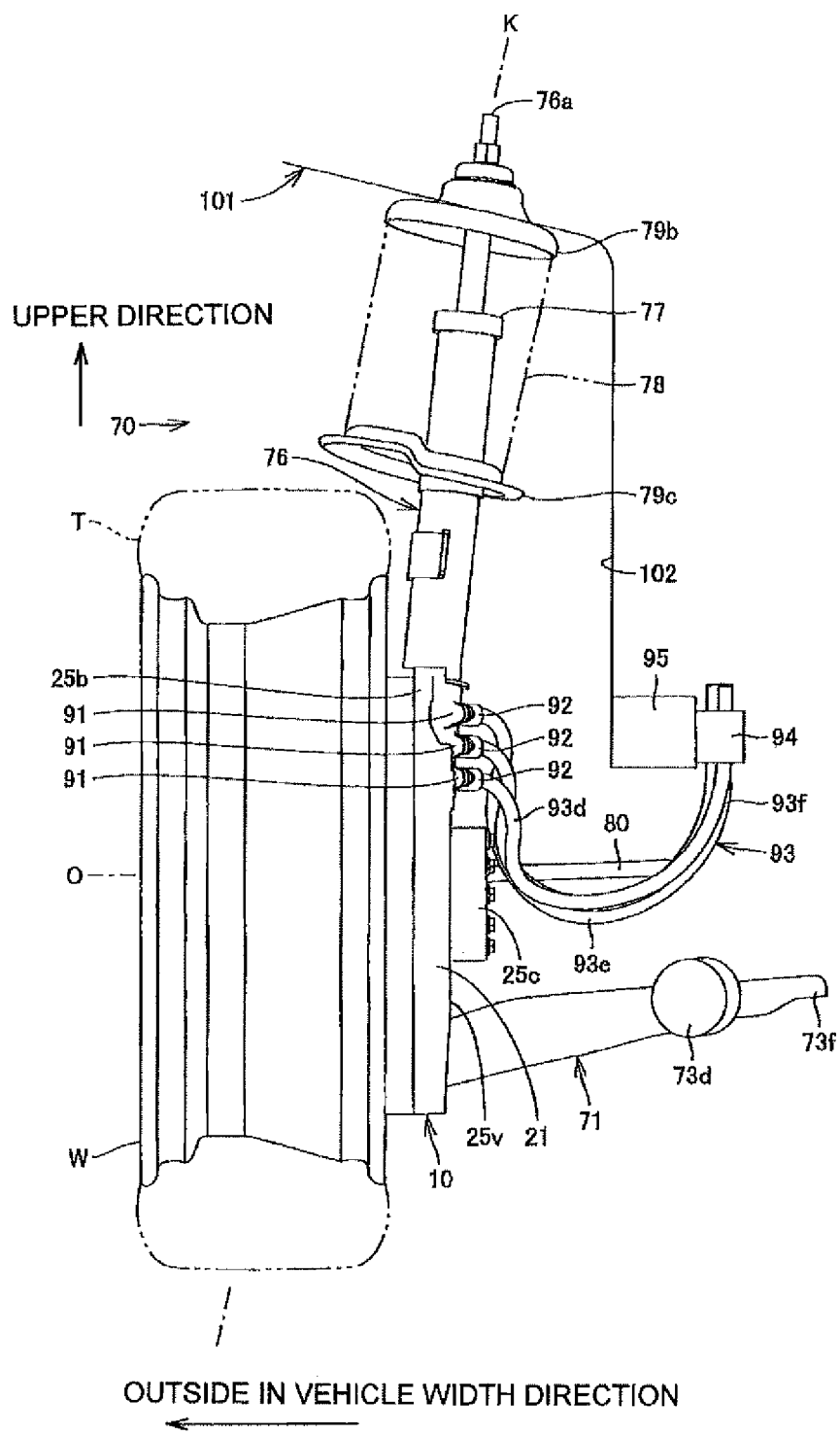
FIG. 2 is a schematic view illustrating the reference example in a state seen from a front of a vehicle.
Figure 3:
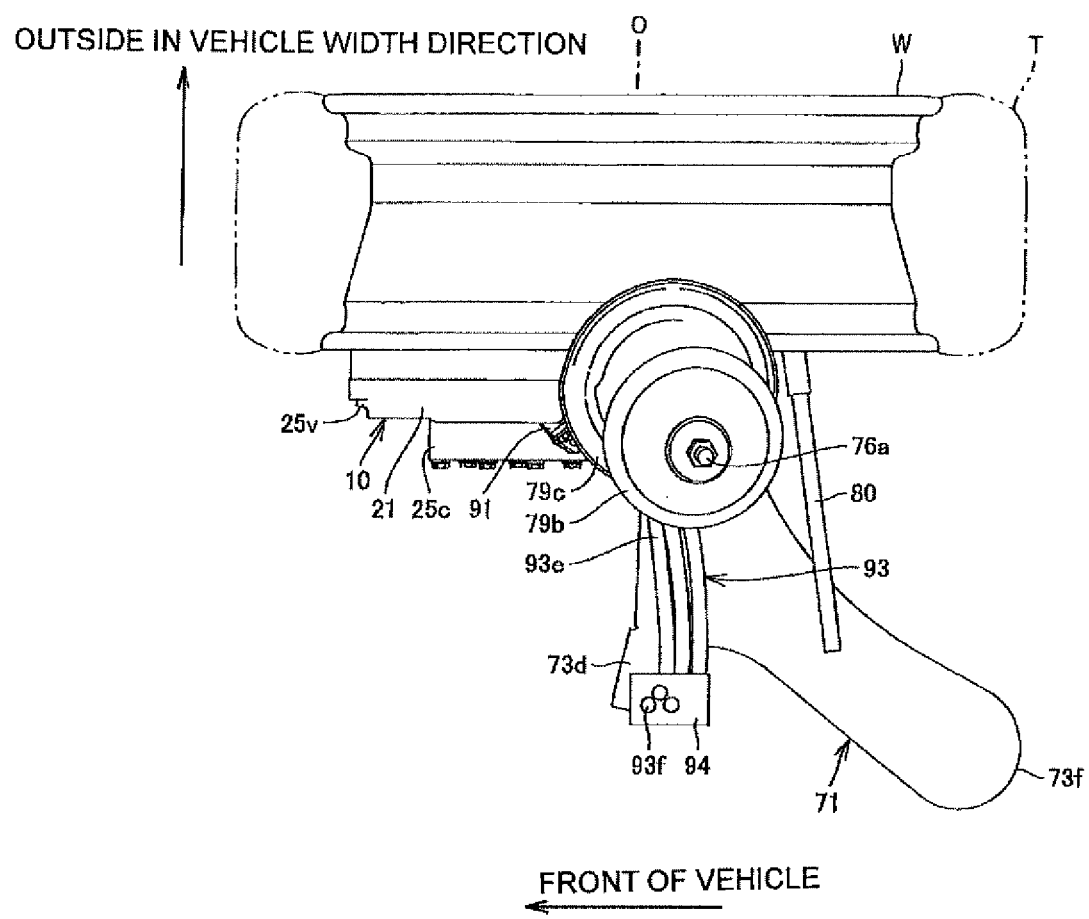
FIG. 3 is a schematic view illustrating the reference example in a state seen from a top of the vehicle.

Embodiments of the present invention will be described below in detail with reference to the drawings. FIG. 1 is a schematic view illustrating an in-wheel motor power line wiring structure of a reference example in a state seen from inside in a vehicle width direction. FIG. 2 is a schematic view illustrating the reference example in a state seen from a front of a vehicle. FIG. 3 is a schematic view illustrating the reference example in a state seen from a top of the vehicle. According to the reference example, road wheel W, in-wheel motor drive devices 10, and a suspension device 70 are disposed outside a vehicle body 101 (only an outside portion of the vehicle body in the vehicle width direction is shown in FIG. 2) in a vehicle width direction. The road wheel W, the in-wheel motor drive devices 10, and the suspension device 70 are disposed symmetrically at both sides of the vehicle body 101 in the vehicle width direction to form an electric vehicle.

A tire T that is indicated by an imaginary line is fitted on an outer periphery of the road wheel W. The road wheel W and the tire T constitute a wheel. A rim portion Wr of the road wheel W defines an inner space region of the wheel. In the inner space region, the in-wheel motor drive device 10 is disposed. The in-wheel motor drive device 10 is coupled to the road wheel W to drive the wheel.

The suspension device 70, which is a strut type suspension device, includes a lower arm 71 that extends in the vehicle width direction and a strut 76 that is arranged above the lower arm 71 and extends in a vertical direction. The strut 76 is arranged more inside than the road wheel W and the in-wheel motor drive device 10 in the vehicle width direction, a lower end of the strut 76 is coupled to the in-wheel motor drive device 10, and an upper end of the strut 76 is coupled to the vehicle body 101 above the road wheel W. The strut 76, an upper portion of the road wheel W, and an upper portion of the in-wheel motor drive device 10 are accommodated in a wheel house 102 that is formed outside the vehicle body 101 in the vehicle width direction.

The strut 76, which has a built-in shock absorber 77 in its upper end region, constitutes a suspension member that can be elastic in the vertical direction. On an outer periphery of the shock absorber 77, a coil spring 78 that is outlined by an imaginary line is arranged to relieve an axial force in the vertical direction acting on the strut 76. At an upper end portion and a middle portion of the strut 76, a pair of coil spring seats 79b, 79c which hold the coil spring 78 by sandwiching an upper end and a lower end of the coil spring 78, are respectively provided. A damper for damping the axial force acting on the strut 76 is provided inside the shock absorber 77.

The lower arm 71, which is a suspension member that is disposed below an axis O of the in-wheel motor drive device 10, includes a vehicle width direction outside end 72 and vehicle width direction inside ends 73d, 73f. At the vehicle width direction outside end 72, the lower arm 71 is coupled to the in-wheel motor drive device 10 through a ball joint 60. At the vehicle width direction inside ends 73d, 73f, the lower arm 71 is coupled to vehicle-body-side members (not shown). The lower arm 71 can be swung in the vertical direction such that the vehicle width direction inside ends 73d, 73f serve as base ends and the vehicle width direction outside end 72 serves as a free end. Incidentally, the vehicle-body-side member means a member attached to a vehicle body side as seen from a corresponding member to be described. A straight line connecting the vehicle width direction outside end 72 and an upper end 76a of the strut 76 extends in the vertical direction to constitute a steering axis K. The steering axis K is basically extended in the vertical direction but permitted to slightly incline in the vehicle width direction and/or the vehicle front-rear direction. In the drawings, when there is no need to make a distinction between the vehicle width direction inside ends 73d, 73f each other, the reference numeral 73 is simply designated.

A tie rod 80 is arranged above the lower arm 71. The tie rod 80 extends in the vehicle width direction and a vehicle width direction outside end of the tie rod 80 is rotatably coupled to the in-wheel motor drive device 10. A vehicle width direction inside end of the tie rod 80 is coupled to a steering device (not shown). The steering device makes the tie rod 80 advance and retract in the vehicle width direction to steer the in-wheel motor drive device 10 and the road wheel W around the steering axis K.

A description of the in-wheel motor drive device will be made hereinafter.

Figure 4:
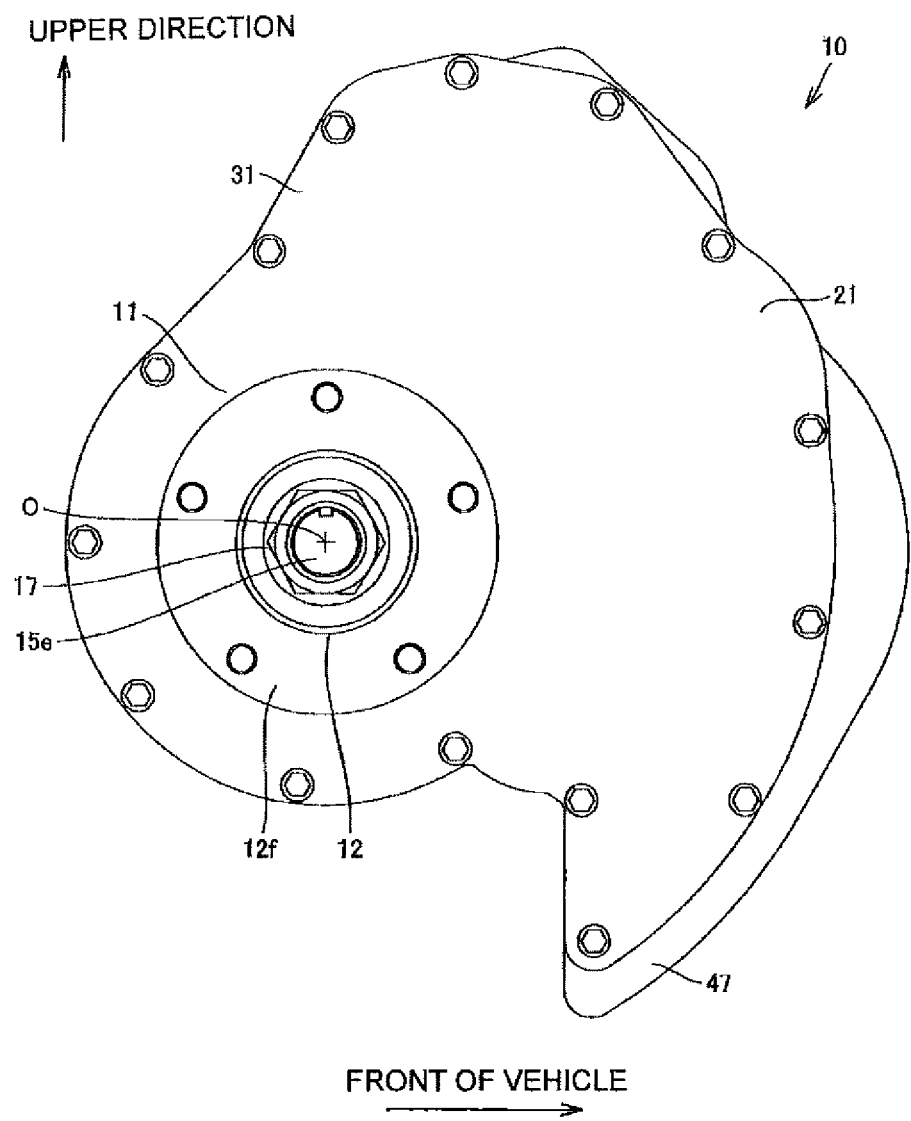
FIG. 4 is a schematic view illustrating an in-wheel motor drive device in a state seen from outside in the vehicle width direction.
Figure 5:
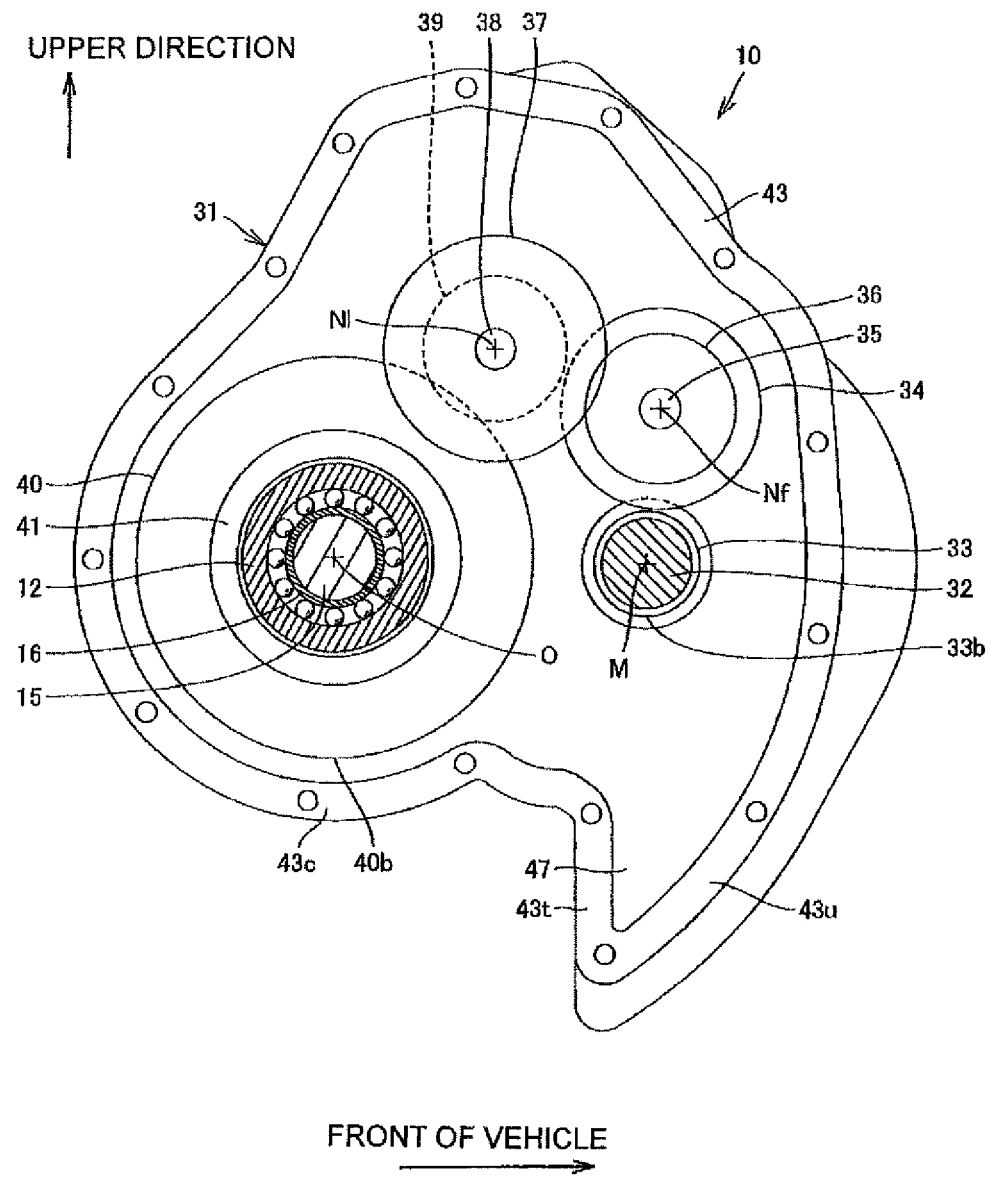
FIG. 5 is a transverse sectional view illustrating the in-wheel motor drive device.
Figure 6:
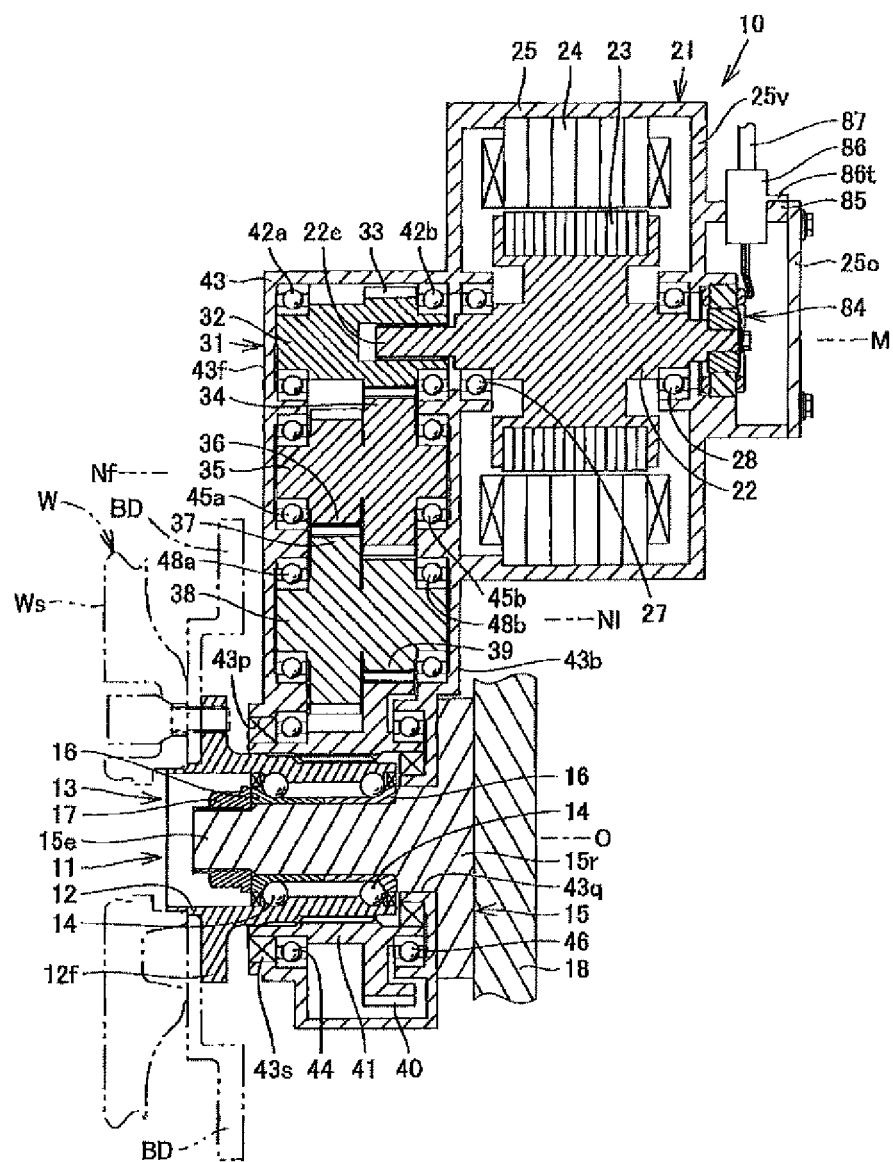
FIG. 6 is a developed sectional view illustrating the in-wheel motor drive device.
Figure 7:
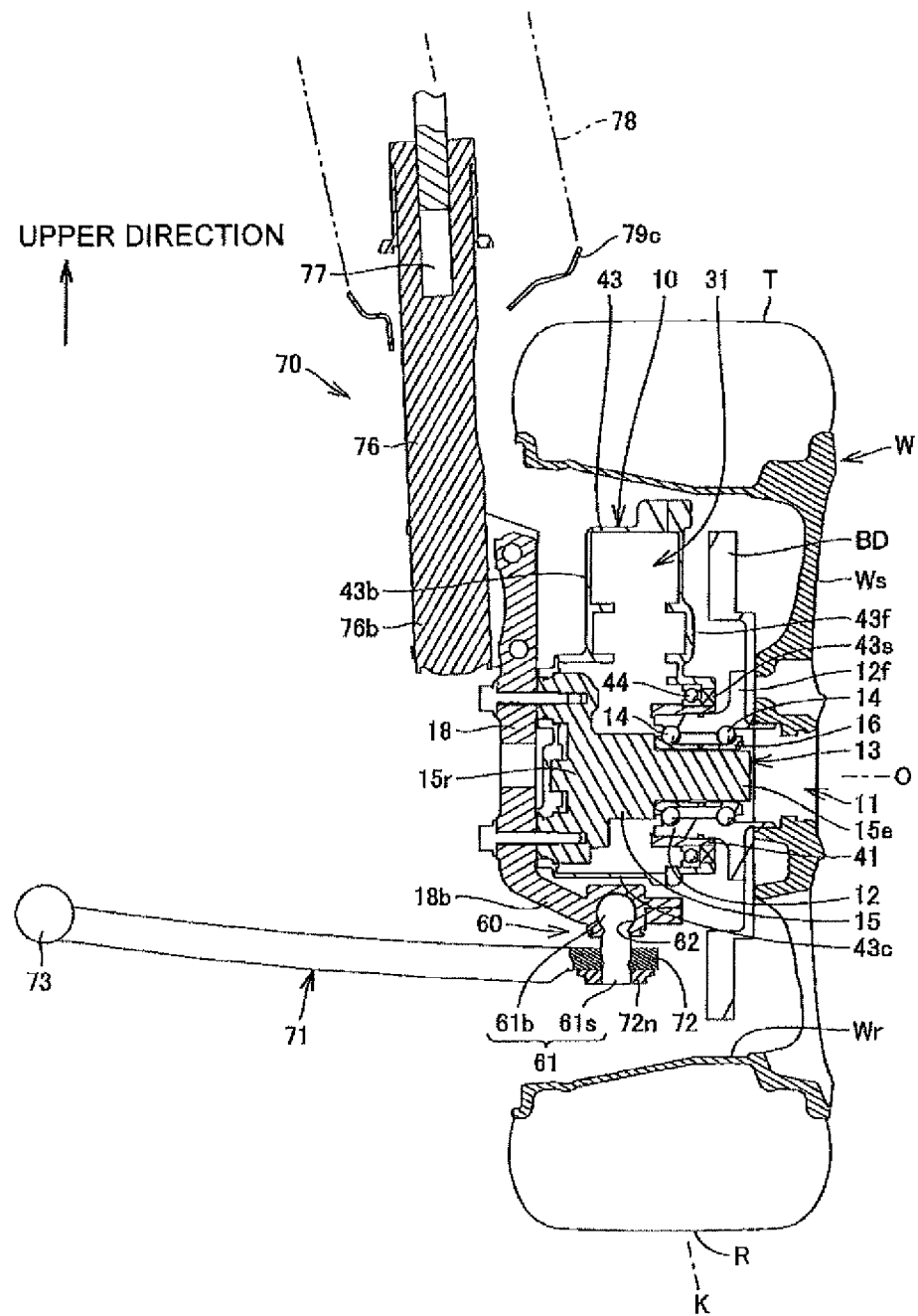
FIG. 7 is a longitudinal sectional view schematically illustrating the in-wheel motor drive device and a suspension device.

FIG. 4 is a schematic view illustrating the in-wheel motor drive device taken out from FIGS. 1 to 3, in a state seen from outside in the vehicle width direction. FIG. 5 is a transverse sectional view schematically illustrating the in-wheel motor drive device in a state seen from outside in the vehicle width direction. In FIG. 5, each gear in a speed reduction unit is represented by an addendum circle and each cog is not shown. FIG. 6 is a developed sectional view schematically illustrating the in-wheel motor drive device. A cross section shown in FIG. 6 is a developed plan that is constituted by connecting, in the following order, a plane including an axis M and an axis Nf shown in FIG. 5, a plane including the axis Nf and an axis NI, and a plane including the axis NI and the axis O. FIG. 7 is a vertical sectional view illustrating the in-wheel motor drive device together with the wheel and the suspension device. In order to avoid complication of the drawings, each gear inside the speed reduction unit is not shown in FIG. 7.

As shown in FIG. 6, the in-wheel motor drive device 10, which includes a wheel hub bearing portion 11 coupled to a center of the road wheel W represented by an imaginary line, a motor unit 21 that drives the road wheel W of the wheel, and a speed reduction unit 31 that reduces rotation of the motor unit and transmits the reduced rotation to the wheel hub bearing portion 11, is arranged in a wheel house (not shown) of the electric vehicle. The motor unit 21 and the speed reduction unit 31 are not coaxially arranged with the axis O of the wheel hub bearing portion 11 and are arranged offset with respect to the axis O of the wheel hub bearing portion 11 as shown in FIG. 5. The in-wheel motor drive device 10 allows the electric vehicle to run at a speed of 0 to 180 km/h on public roads.

As shown in FIG. 6, the wheel hub bearing portion 11 includes an outer ring 12 serving as a wheel hub coupled with the road wheel W, an inner fixed member 13 passing through a center hole of the outer ring 12, and a plurality of rolling bodies 14 arranged in an annular gap defined between the outer ring 12 and the inner fixed member 13, to constitute an axle assembly. The inner fixed member 13 includes a non-rotating fixed shaft 15, a pair of inner races 16, a lock nut 17, and a carrier 18. The fixed shaft 15 is formed such that a root portion 15*r* thereof is set to be larger in diameter than a tip portion 15*e* thereof. The inner races 16 are fitted on an outer periphery of the fixed shaft 15 between the root portion 15*r* and the tip portion 15*e*. The lock nut 17 is screwed with the tip portion 15*e* of the fixed shaft 15 to fix the inner races 16 between the lock nut 17 and the root portion 15*r*.

The fixed shaft 15, which extends along the axis O, passes through a main body casing 43 that serves as an outer shell of the speed reduction unit 31. The tip portion 15*e* of the fixed shaft 15 passes through an opening 43*p* formed on a front surface portion 43*f* of the main body casing 43 and projects more outside in the vehicle width direction than the front surface portion 43*f*. The root portion 15*r* of the fixed shaft 15 passes through an opening 43*q* formed on a back surface portion 43*b* from more inside in the vehicle width direction than the back surface portion 43*b* of the main body casing 43. The front surface portion 43*f* and the back surface portion 43*b* are wall portions opposed each other with a space therebetween in a direction of the axis O. The carrier 18 is fixedly attached to the root portion 15*r*. The carrier 18 is coupled to the suspension device 70 and the tie rod 80 outside the main body casing 43.

The rolling bodies 14 are arranged in double-row to be apart from each other in the direction of the axis O. An outer peripheral surface of one of the inner races 16 in the direction of the axis O, which constitutes an inner raceway surface for the rolling body 14 belonging a first row, faces axially one side of inner circumferential surfaces of the outer ring 12 in the direction of the axis O. An outer peripheral surface of the other of the inner races 16 in the direction of the axis O, which constitutes an inner raceway surface for the rolling body 14 belonging a second row, faces axially the other side of inner circumferential surfaces of the outer ring 12 in the direction of the axis O. In the following description, the outside in the vehicle width direction (outboard side) may be also referred to as one in the direction of the axis, while the inside in the vehicle width direction (inboard side) may be also referred to as the other in the direction of the axis. In FIG. 6, the left-right direction of the page corresponds to the vehicle width direction. The inner circumferential surface of the outer ring 12 constitutes an outer raceway surface for the rolling bodies 14.

A flange portion 12*f* is formed at one end of the outer ring 12 in the direction of the axis O. The flange portion 12*f* constitutes a coupling seat portion for being coaxially coupled to a brake disc BD and a spoke portion We of the road wheel W. The outer ring 12 is coupled at the flange portion 12*f* with the brake disc BD and the road wheel W to rotate integrally with the road wheel W. As a modification not shown, the flange portion 12*f* may be a plurality of circumferentially spaced projections that extend in an outer radial side.

As shown in FIG. 6, the motor unit 21 includes a motor rotation shaft 22, a rotor 23, a stator 24, a motor casing 25, and a motor casing cover 25*v* which are sequentially arranged in this order from the axis M of the motor unit 21 to the outer radial side. The motor unit 21 is a radial gap motor of an inner rotor/outer stator type, but the motor unit 21 may be another type motor unit. For example, the motor unit 21 may be also an axial gap motor (not shown).

The axis M that is a rotation center of the motor rotation shaft 22 and the rotor 23 extends in parallel to the axis O of the wheel hub bearing portion 11. That is, the motor unit 21 is arranged offset to be apart from the axis O of the wheel hub bearing portion 11. Most axial direction positions of the motor unit 21, other than a tip portion of the motor rotation shaft 22, are not superimposed on the axial direction position of the inner fixed member 13 as shown in FIG. 6. The motor casing 25, which has a cylindrical shape, is connected to the back surface portion 43*b* of the main body casing 43 at one end in the direction of the axis M and is sealed at the other end in the direction of the axis M with the lid-shaped motor casing cover 25*v*. Both ends of the motor rotation shaft 22 are rotatably supported by the motor casing 25 and the motor casing cover 25*v* through rolling bearings 27, 28. The motor unit 21 drives the outer ring 12 and the wheel.

As shown in FIG. 1, a power line terminal box 25*b* is provided on an upper portion of the in-wheel motor drive device 10. The power line terminal box 25*b* is configured to bridge between an upper portion of the motor casing 25 (FIG. 6) and an upper portion of the motor casing cover 25*v* (FIG. 6) and has a plurality of power line connecting portions 91. The power line terminal box 25*b* includes three power line connecting portions 91 to receive three-phase AC power. One end of a power line 93 is connected to the corresponding power line connecting portion 91. Inside the power line terminal box 25*b*, a core wire of the power line 93 is connected to a lead wire extending from a coil of the stator 24.

A signal line terminal box 25*c* is formed at a center portion of the motor casing cover 25*v*. The signal line terminal box 25*c* is separated from the power line terminal box 25*b*. As shown in FIG. 6, the signal line terminal box 25*c* is disposed to intersect the axis M. The signal line terminal box 25*c* accommodates a rotation angle sensor 84. The rotation angle sensor 84 is provided at an end portion in the direction of the axis of the motor rotation shaft 22 to detect a rotation angle of the motor rotation shaft 22. The signal line terminal box 25*c* is provided with a signal line connecting portion 85. The signal line connecting portion 85 includes a wall portion of the signal line terminal box 25*c*, a through hole that penetrates the wall portion, and a female screw hole (not shown) provided in the wall portion near the through hole. A sleeve 86 and a signal line 87 pass through the through hole. The sleeve 86, which is a cylindrical body, is stuck to an outer periphery of the signal line 87 to protect the signal line 87 and seals an annular gap between the through hole and the signal line 87. On an outer peripheral surface of the sleeve 86, a tongue portion 86*t* that projects in an outer radial direction of the sleeve is formed. A bolt not shown in FIG. 6 is screwed into the tongue portion 86*t* and the female screw hole of the signal line connecting portion 85 to fixedly attach the sleeve 86 to the signal line connecting portion 85.

The signal line 87, which is flexible, includes a plurality of core wires made of an electric conductor and an insulated cover portion that covers the plurality of core wires to bind them. One end of the signal line 87 is connected to the signal line connecting portion 85. Although not shown, the signal line 87 extends from the one end thereof to the vehicle body 101 (FIG. 2).

Each power line connecting portion 91, which is also configured like the signal line connecting portion 85, includes a wall portion of the power line terminal box 25b, a through hole that penetrates the wall portion, and a female screw hole (not shown) provided in the wall portion near the through hole. A sleeve 92 and one end portion of the power line 93 pass through the through hole. The sleeve 92 and the power line 93 extend from the through hole of the power line connecting portion 91 to a side of the vehicle body 101. The power line 93, which passes through the sleeve 92, extends from the sleeve 92 to the side of the vehicle body 101. Each sleeve 92, which is a cylindrical body, is stuck to an outer periphery of the power line 93 to protect the power line 93. Each sleeve 92 is fixedly inserted into the through hole of the power line connecting portion 91 together with the one end portion of the power line 93 to hold the one end of the power line 93, and further seals an annular gap between the power line 93 and the through hole. In order to lock the sleeve 92 not to come out, a tongue portion 92t that projects in the outer radial direction of the sleeve is formed on an outer peripheral surface of the sleeve 92. A bolt 91b shown in FIG. 1 is screwed into the tongue portion 92t and the female screw hole of the power line connecting portion 91 to fixedly attach the sleeve 92 to the power line connecting portion 91.

The speed reduction unit 31 includes an input shaft 32, an input gear 33, an intermediate gear 34, an intermediate shaft 35, an intermediate gear 36, an intermediate gear 37, an intermediate shaft 38, an intermediate gear 39, an output gear 40, an output shaft 41, and the main body casing 43. The input shaft 32, which is a cylindrical body that has a larger diameter than the tip portion 22e of the motor rotation shaft 22, extends along the axis M of the motor unit 21. The tip portion 22e is received in a center hole of the other end portion in the direction of the axis M of the input shaft 32 and the input shaft 32 is coaxially coupled to the motor rotation shaft 22. Both ends of the input shaft 32 are supported by the main body casing 43 through rolling bearings 42a, 42b. The input gear 33, which is an external gear having a smaller diameter than that of the motor unit 21, is coaxially coupled to the input shaft 32. Specifically, the input gear 33 is integrally formed on an outer periphery of a central portion of the input shaft 32 in the direction of the axis M.

The output shaft 41, which is a cylindrical body having a larger diameter than that of a cylindrical portion of the outer ring 12, extends along the axis O of the wheel hub bearing portion 11. The other end of the outer ring 12 in the direction of the axis O is received in a center hole at one end of the output shaft 41 in the direction of the axis O and the output shaft 41 is coaxially coupled with the outer ring 12. Rolling bearings 44, 46 are disposed on outer peripheries of both ends of the output shaft 41 in the direction of the axis O. The one end of the output shaft 41 in the direction of the axis O is supported by the front surface portion 43f of the main body casing 43 through the rolling bearing 44. The other end of the output shaft 41 in the direction of the axis O is supported by the back surface portion 43b of the main body casing 43 through the rolling bearing 46. The output gear 40, which is an external gear, is coaxially coupled with the output shaft 41. Specifically, the output gear 40 is integrally formed on the outer periphery of the other end of the output shaft 41 in the direction of the axis O.

The two intermediate shafts 35, 38 extend in parallel to the input shaft 32 and the output shaft 41. That is to say, the speed reduction unit 31 is a four-axis parallel axes reduction gear in which the axis O of the output shaft 41, the axis Nf of the intermediate shaft 35, the axis Nl of the intermediate shaft 38, and the axis M of the input shaft 32 extend in parallel each other, in other words, extend in the vehicle width direction.

Describing with respect to a position of each of the axes in the vehicle front-rear direction, as shown in FIG. 5, the axis M of the input shaft 32 is disposed at a more front position of the vehicle than that of the axis O of the output shaft 41. The axis Nf of the intermediate shaft 35 is disposed at a more front position of the vehicle than that of the axis M of the input shaft 32. The axis NI of the intermediate shaft 38 is disposed at a more front position of the vehicle than that of the axis O of the output shaft 41 and at a more rear position of the vehicle than that of the axis M of the input shaft 32. As a modification not shown, the axis M of the input shaft 32, the axis Nf of the intermediate shaft 35, the axis NI of the intermediate shaft 38, and the axis O of the output shaft 41 may be arranged in this order in the vehicle front-rear direction. This order is also a transmission order of a driving force.

Describing with respect to a position of each of the axes in the vertical direction, the axis M of the input shaft 32 is disposed at a more upper position than that of the axis O of the output shaft 41. The axis Nf of the intermediate shaft 35 is disposed at a more upper position than that of the axis M of the input shaft 32. The axis NI of the intermediate shaft 38 is disposed at a more upper position than that of the axis Nf of the intermediate shaft 35. Incidentally, it is sufficient for the plurality of intermediate shafts 35, 38 to be disposed above the input shaft 32 and the output shaft 41, and the intermediate shaft 35 may be disposed above the intermediate shaft 38 as a modification not shown. Alternatively, as a modification not shown, the output shaft 41 may be disposed above the input shaft 32.

The intermediate gear 34 and the intermediate gear 36, which are external gears, are coaxially coupled to a central portion of the intermediate shaft 35 in the direction of the axis Nf, as shown in FIG. 6. Both ends of the intermediate shaft 35 are supported by the main body casing 43 through rolling bearings 45a, 45b. The intermediate gear 37 and the intermediate gear 39, which are external gears, are coaxially coupled to a central portion of the intermediate shaft 38 in the direction of the axis Nl. Both ends of the intermediate shaft 38 are supported by the main body casing 43 through rolling bearings 48a, 48b.

The main body casing 43, which is formed to serve as an outer shell of the speed reduction unit 31 and the wheel hub bearing portion 11, is formed into a cylindrical shape, and surrounds the axes O, Nf, Nl, and M as shown in FIG. 5. The main body casing 43 is accommodated in the inner space region of the road wheel W as shown in FIG. 7. The inner space region of the road wheel W is defined by an inner peripheral surface of the rim portion Wr and the spoke portion Ws coupled to one end of the rim portion Wr in the direction of the axis O. Then, one regions in the directions of the axes of the wheel hub bearing portion 11, the speed reduction unit 31, and the motor unit 21 are accommodated in the inner space region of the road wheel W. The other region in the direction of the axis of the motor unit 21 protrudes from the road wheel W to the other in the direction of the axis. As described above, the road wheel W accommodates most part of the in-wheel motor drive device 10.

With reference to FIG. 5, the main body casing 43 has a right-under portion 43c to be positioned right under the axis O and a downward projecting portion at a position apart from the axis O of the output gear 40 in the vehicle front-rear direction, the position being specifically a position right under the axis M of the input gear 33. This projecting portion forms an oil tank 47 and is disposed below the right-under portion 43c.

With reference to FIG. 7, right under the right-under portion 43c, a lower end portion 18b of the carrier 18 and the vehicle width direction outside end 72 of the lower arm 71 are disposed, and the vehicle width direction outside end 72 of the lower arm 71 is coupled to the lower end portion 18b freely in every direction through a ball joint 60. As shown in FIG. 5, as seen in the direction of the axis O, the oil tank 47 is defined by a substantially vertical rear side wall portion 43t and a slanted front side wall portion 43u and is formed into a triangular shape which becomes narrower downward. Incidentally, the rear side wall portion 43t and the ball joint 60 (FIG. 7) face in the vehicle front-rear direction each other with a space therebetween. The front side wall portion 43u faces front and lower side portions of the rim portion Wr (FIG. 7).

The ball joint 60 includes, as shown in FIG. 7, a ball stud 61 and a socket 62. The ball stud 61 extends in the vertical direction and has a ball portion 61b formed at an upper end and a stud portion 61s formed at a lower end. The socket 62, which is provided on the inner fixed member 13, slidably receives the ball portion 61b. The stud portion 61s passes vertically through the vehicle width direction outside end 72 of the lower arm 71. A male screw, which is formed on an outer periphery of a lower end of the stud portion 61s, is screwed with a nut 72n from the below, so that the stud portion 61s is fixedly attached to the lower arm 71. As shown in FIG. 1, the ball joint 60 is positioned above a lower end of the oil tank 47. The ball joint 60 and the oil tank 47 are disposed in the inner space region of the road wheel W, the ball joint 60 is disposed just below the axis O, and the oil tank 47 is disposed apart from the ball joint 60 in the vehicle front-rear direction. As shown in FIG. 7, the ball joint 60 is disposed more outside in the vehicle width direction than the back surface portion 43b. The steering axis K extends in the vertical direction to pass through a ball center of the ball portion 61b and intersects the fixed shaft 15 and a ground contact surface R of a tire T. An upper end portion of the carrier 18 is fixedly attached to the lower end of the strut 76.

The main body casing 43 is formed into a cylindrical shape and, as shown in FIG. 6, accommodates the input shaft 32, the input gear 33, the intermediate gear 34, the intermediate shaft 35, the intermediate gear 36, the intermediate gear 37, the intermediate shaft 38, the intermediate gear 39, the output gear 40, the output shaft 41, and a central portion of the wheel hub bearing portion 11 in the direction of the axis O. Inside the main body casing 43, lubricating oil is enclosed to lubricate the speed reduction unit 31. The input gear 33, the intermediate gear 34, the intermediate gear 36, the intermediate gear 37, the intermediate gear 39, and the output gear 40 are helical gears.

The main body casing 43 includes a cylindrical portion that includes, as shown in FIG. 5, the right-under portion 43c and the oil tank 47, the substantially flat front surface portion 43f that covers, as shown in FIG. 6, one side in the direction of the axis of a cylindrical portion of the speed reduction unit 31, and the substantially flat back surface portion 43b that covers the other side in the direction of the axis of the cylindrical portion of the speed reduction unit 31. The back surface portion 43b is coupled to the motor casing 25. Also, the back surface portion 43b is coupled to the fixed shaft 15.

The opening 43p through which the outer ring 12 passes is formed on the front surface portion 43f. The opening 43p is provided with a sealing material 43s for sealing an annular gap formed between the opening 43p and the outer ring 12. Hence, the outer ring 12 that serves as a rotation body is accommodated in the main body casing 43 except for one end portion in the direction of the axis O. A sealing material 43v is disposed on an inner peripheral surface of the other end portion in the direction of the axis O of the outer ring 12. The sealing material 43v seals an annular gap between the outer ring 12 and the back surface portion 43b.

The input gear 33 having a small diameter and the intermediate gear 34 having a large diameter are arranged on the other side in the direction of the axis of the speed reduction unit 31 (the motor unit 21 side) and are meshed with each other. The intermediate gear 36 having a small diameter and the intermediate gear 37 having a large diameter are arranged on one side in the direction of the axis of the speed reduction unit 31 (the flange portion 12f side) and are meshed with each other. The intermediate gear 39 having a small diameter and the output gear 40 having a large diameter are arranged on the other side in the direction of the axis of the speed reduction unit 31 and are meshed with each other. In such a way, the input gear 33, the plurality of intermediate gears 34, 36, 37, and 39, and the output gear 40 are meshed with each other, so that a drive transmission path from the input gear 33 to the output gear 40 through the plurality of intermediate gears 34, 36, 37, and 39 is constituted. Then, because of aforementioned each mesh engagement between the small-diameter gear and the large-diameter gear, a rotation of the input shaft 32 is reduced on the intermediate shaft 35, a rotation of the intermediate shaft 35 is reduced on the intermediate shaft 38, and a rotation of the intermediate shaft 38 is reduced on the output shaft 41. As a result, the speed reduction unit 31 secures a sufficient reduction gear ratio. Among the plurality of intermediate gears, the intermediate gear 34 is a first intermediate gear located on an input side of the drive transmission path. Among the plurality of intermediate gears, the intermediate gear 39 is a final intermediate gear located on an output side of the drive transmission path.

As shown in FIG. 5, the output shaft 41, the intermediate shaft 38, and the input shaft 32 are arranged in this order with a space therebetween in the vehicle front-rear direction. Further, the intermediate shaft 35 and the intermediate shaft 38 are disposed above the input shaft 32 and the output shaft 41. In accordance with this reference example, it is possible to arrange the intermediate shaft above the outer ring 12 that serves as the wheel hub, to secure a space for arranging the oil tank 47 below the outer ring 12, and to secure a space just below outer ring 12 for receiving the ball joint 60 (FIG. 7). Therefore, it is possible to provide the steering axis K that extends in the vertical direction to intersect the wheel hub bearing portion 11, and to appropriately steer the road wheel W and the in-wheel motor drive device 10 around the steering axis K.

A description of the in-wheel motor power line wiring structure will be made hereinafter.

Figure 8:
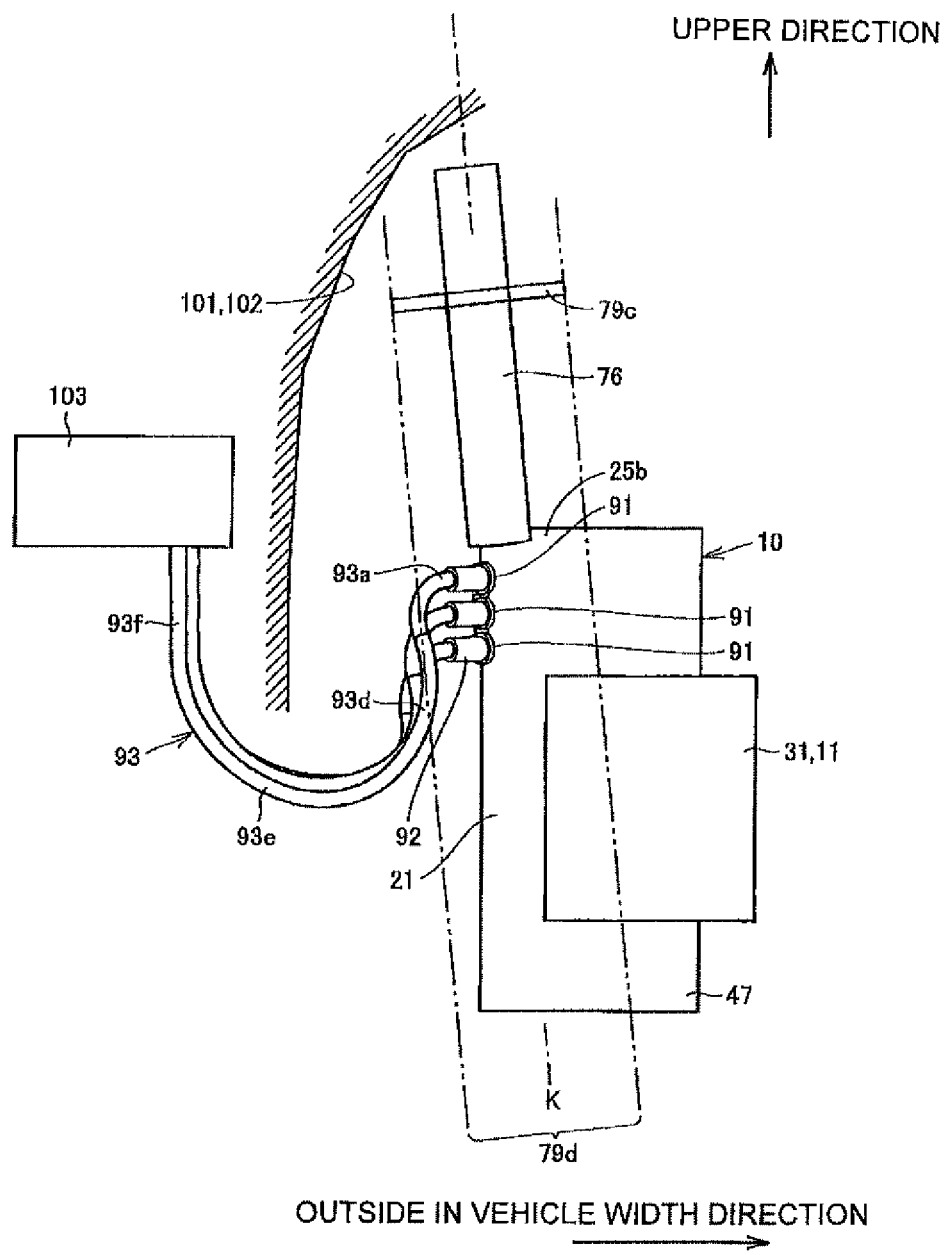
FIG. 8 is a schematic view illustrating the in-wheel motor drive device and a power line in a state seen from a rear of the vehicle.
Figure 9:
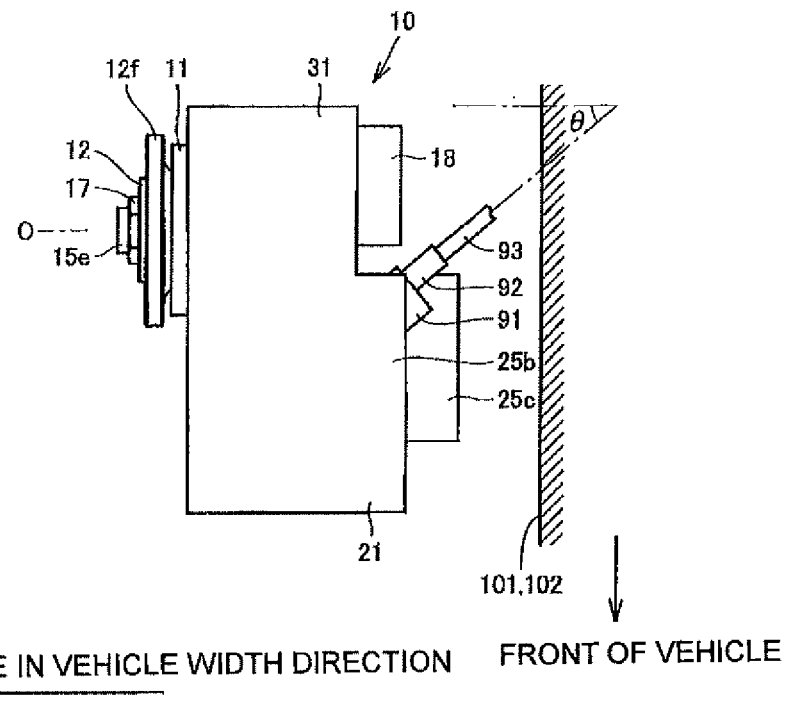
FIG. 9 is a schematic view illustrating the in-wheel motor drive device and the power line in a state seen from the top of the vehicle in a direction of a steering axis.

FIGS. 8 and 9 are schematic views illustrating the in-wheel motor drive device and the power line, FIG. 8 illustrates a state seen from the rear of the vehicle, and FIG. 9 illustrates a state seen from the top of the vehicle. In the reference example, the three power lines 93 extend from the in-wheel motor drive device 10 to the vehicle body 101. The three power lines 93 supply three-phase AC power from the vehicle body 101 to the motor unit 21. Each power line 93, which is flexible, includes a core wire made of an electric conductor and an insulated cover portion that covers entire circumference of the core wire. The one end of the power line 93 is held by the corresponding power line connecting portion 91 and the sleeve 92 such that the other end side takes a slant orientation toward the rear of the vehicle and the inside in the vehicle width direction. Specifically, the one end portion of the power line 93 is slantingly held so as to intersect and extend at an angle θ° with respect to a reference line parallel to the axle (axis O) in a straight forward direction not steered. Incidentally, the angle θ is a fixed value included in a range between not less than α° as the maximum turning angle of the in-wheel motor drive device 10 and not more than 90°. When θ is 90°, the one end portion of each power line 93 extends parallel to the vehicle front-rear direction. The other end of the power line 93 is connected to an inverter 103 mounted on the vehicle body 101.

As shown in FIG. 8, the one end portions of the power lines 93 are aligned with a space each other in the direction of the steering axis K, and the one end portions are arranged to be superimposed as seen from the direction of the steering axis K as shown in FIG. 9. The one end portion of each power line 93 is arranged such that all the power line connecting portions 91 are superimposed each other as shown in FIG. 9.

Each power line 93 includes three continuously extending regions between the one end and the other end thereof. In these three regions, a region on a side connected to the in-wheel motor drive device 10 is referred to as an in-wheel motor drive device side region 93d, a region on a side connected to the vehicle body 101 is referred to as a vehicle body side region 93f, and a region between the in-wheel motor drive device side region 93d and the vehicle body side region 93f is referred to as an intermediate region 93e.

The in-wheel motor drive device side region 93d extends in the vertical direction to be connected to a side of the in-wheel motor drive device 10 at an upper side of the in-wheel motor drive device side region 93d and to be connected to the intermediate region 93e at a lower side of the in-wheel motor drive device side region 93d. The vehicle body side region 93f extends in the vertical direction to be connected to the intermediate region 93e at a lower side of the vehicle body side region 93f and to be connected to a side of the vehicle body 101 at an upper side of the vehicle body side region 93f. The intermediate region 93e extends to be curved such that both sides of the intermediate region 93e take upper positions and an intermediate portion of the intermediate region 93e takes a lower position.

One end portion of each power line 93 connected to the corresponding power line connecting portion 91 extends in a horizontal direction toward the in-wheel motor drive device side region 93d, but soon turning its direction downward, extends and connects to an upper side of the in-wheel motor drive device side region 93d. The in-wheel motor drive device side region 93d is not held by a clamp member.

As shown in FIG. 2, the plurality of power lines 93 are bound by a clamp member 94 at the other end side relative to the vehicle body side region 93f and held so as to extend in the vertical direction. For this reason, the vehicle body side region 93f extends in the vertical direction below the clamp member 94 without being held by the clamp member. The clamp member 94 is fixedly attached to the vehicle body 101 through a bracket 95. It is possible to wire the vehicle body side region 93f more inside in the vehicle width direction than a wheel house 102 by arranging the bracket 95 more inside in the vehicle width direction than the wheel house 102. Then, it is possible to make the wheel house 102 smaller by bringing a wall surface of the wheel house 102 close to the in-wheel motor drive device 10 as well as to be able to wire the power lines 93 to bypass the wheel house 102.

As shown in FIG. 2, a vertical position of the clamp member 94 is superimposed on a vertical position at least one of the three power line connecting portions 91. For this reason, all of the power lines 93 are held by the in-wheel motor drive device 10 and the vehicle body 101 in a state in which the power lines 93 are curved to swell downwardly in a U-shape.

As shown in FIG. 1, the power line terminal box 25b and the three power line connecting portions 91 are arranged at a more front position of the vehicle than that of the axis O and each of the power line connecting portions 91 is directed to the rear of the vehicle. Thus, it is possible to wire the in-wheel motor drive device side region 93d near the steering axis K. As a modification not shown, the power line terminal box 25b and the three power line connecting portions 91 may be arranged at a more rear position of the vehicle than that of the axis O and each of the power line connecting portions 91 may be directed to the front of the vehicle.

Also, in a state in which the road wheel W is not steered to travel straight, the three power line connecting portions 91 are arranged at a more front position of the vehicle than that of the axis O and the clamp member 94 is arranged at a more rear position of the vehicle than that of the axis O. Thus, it is possible to wire the in-wheel motor drive device side region 93d near the steering axis K. As a modification not shown, the three power line connecting portions 91 may be arranged at a more rear position of the vehicle than that of the axis O and the clamp member 94 may be arranged at a more front position of the vehicle than that of the axis O. In any case, in the state in which the road wheel W travels straight, it is preferable that a position of the in-wheel motor drive device side region 93d in the vehicle front-rear direction is arranged to be superimposed on a position of the vehicle body side region 93f in the vehicle front-rear direction.

The in-wheel motor drive device side region 93d is disposed relatively outside in the vehicle width direction, and the vehicle body side region 93f is disposed inside in the vehicle width direction. Therefore, the intermediate region 93e extends in the vehicle width direction. The intermediate region 93e is suspended at both sides thereof by the in-wheel motor drive device side region 93d and the vehicle body side region 93f and floats in the air without being held by the clamp member.

A description of a power line connecting portion of the reference example will be made hereinafter.

Figure 10:
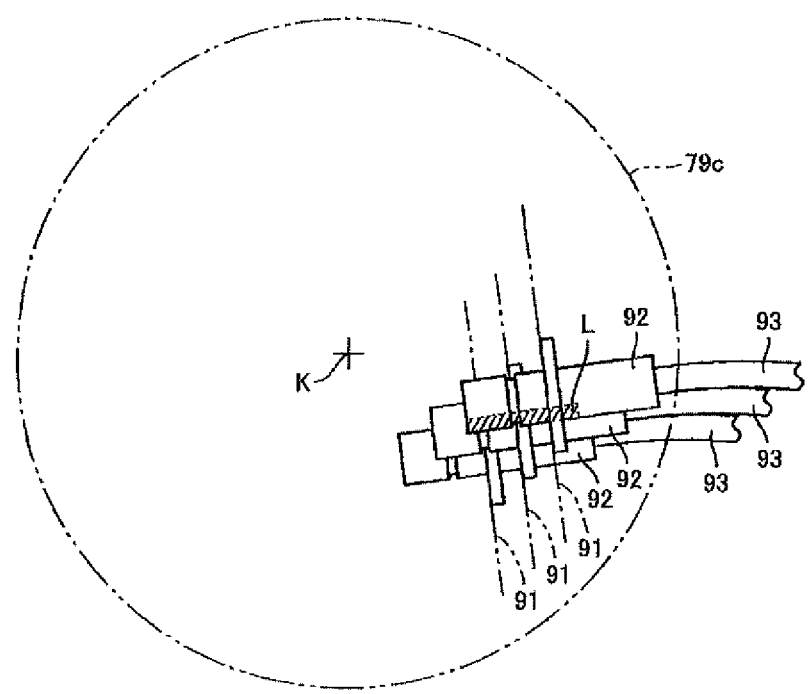
FIG. 10 is a schematic view illustrating the power line and a sleeve taken out from the in-wheel motor drive device in a state seen from the top in the direction of the steering axis.

FIG. 10 is a schematic view illustrating the power line and the sleeve taken out from the in-wheel motor drive device in a state seen from the top in the direction of the steering axis K. In order to avoid complication of the drawings, power line connecting portions 91 are represented in an imaginary line in FIG. 10. The sleeves 92 are identical to one another in dimension and shape, and are arranged to be partly superimposed as seen in the direction of the steering axis K. A superimposed portion L of each sleeve 92 is common to all the three sleeves 92. Alternatively, an arrangement not shown may be available in which an entire of each sleeve 92 is superimposed on an entire of another sleeve 92.

Figure 11:
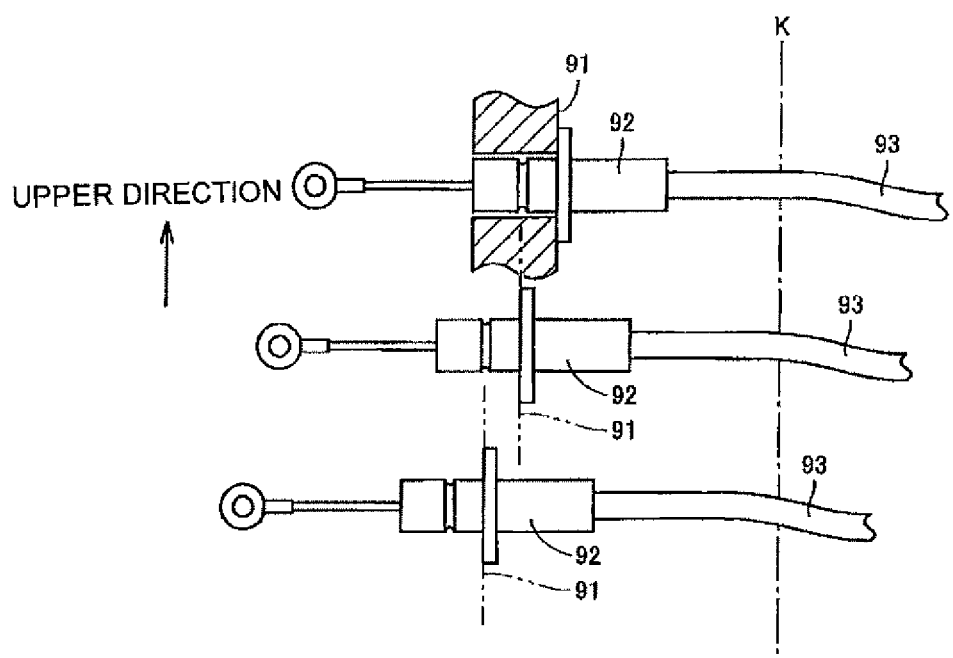
FIG. 11 is a schematic view illustrating the power line and the sleeve taken out from the in-wheel motor drive device in a state seen in the vehicle width direction.

FIG. 11, corresponding to FIG. 10, is a schematic view illustrating the power line and the sleeve taken out from the in-wheel motor drive device in a state seen in the vehicle width direction. In order to avoid complication of the drawings, only one power line connecting portion 91 is represented by a solid line and other power line connecting portions 91 are represented by imaginary lines shown in FIG. 11. According to the reference example, as shown in FIG. 10 and FIG. 11, distances from the steering axis K to the sleeves 92 are substantially the same. Therefore, stresses applied to the power lines 93 during steering can be substantially the same.

Incidentally, according to the reference example, each power line 93 includes the in-wheel motor drive device side region 93d, the intermediate region 93e, and the vehicle body side region 93f that continuously extend between the one end and the other end. The in-wheel motor drive device side region 93d extends in the vertical direction to be connected to the side of the in-wheel motor drive device 10 at the upper side of the in-wheel motor drive device side region 93d and to be connected to the intermediate region 93e at the lower side of the in-wheel motor drive device side region 93d. The vehicle body side region 93f extends in the vertical direction to be connected to the intermediate region 93e at the lower side of the vehicle body side region 93f and to be connected to the side of the vehicle body 101 at the upper side of the vehicle body side region 93f. The intermediate region 93e extends to be curved such that both sides of the intermediate region 93e take the upper positions and the intermediate portion of the intermediate region 93e takes the lower position. Thus, when the in-wheel motor drive device 10 is steered, each power line 93 is hardly displaced, a degree of curvature of the intermediate region 93e hardly changes, and the in-wheel motor drive device side region 93d is only twisted. Therefore, each power line 93 is not repeatedly bent and stretched, so that bending fatigue is not accumulated in each power line 93.

Although the in-wheel motor drive device 10 bounces and rebounds in the vertical direction by expansion and contraction of the strut 76, the degree of curvature of the intermediate region 93e remains only to change a little and each power line 93 is not repeatedly bent and stretched.

According to the reference example, since the vehicle body side region 93f extends in the vertical direction and is connected to the side of the vehicle body 101 at the upper side thereof, it is possible to wire the power lines 93 to bypass the wheel house 102. Therefore, it is not necessary to perforate a through hole on the wheel house 102 and to pass the power line through the through hole, so that rigidity and strength of the wheel house 102 are not deteriorated. In addition, when the wall surface of the wheel house 102 is transferred more outside in the vehicle width direction than a conventional position, the wall surface of the wheel house 102 can be closer to the in-wheel motor drive device 10. Therefore, it is possible to make the wheel house 102 smaller than conventional structure and to make an interior space larger than the conventional structure.

Further, according to the reference example, since the one end portion of each power line 93 extending from the power line connecting portion 91 is arranged to be at least partly superimposed on another one end portion of the power line 93 as seen in the direction of the steering axis K, it is possible to arrange the one end portions of all the power lines 93 at substantially the same distance from the steering axis K. Therefore, the stress during steering is not concentrated on a specific power line 93, so that lifespans of the power lines 93 can be equalized one another.

In addition, according to the reference example, since at least one of the in-wheel motor drive device side region 93d, the intermediate region 93e, and the vehicle body side region 93f is not held at all, each region can freely bend or twist. Therefore, the stress during steering is not concentrated on a specific place of each region, so that the lifespan of the power line 93 can be extended.

In addition, according to the reference example, since the power lines 93 are held by the clamp member 94 provided on the vehicle body 101 at the other side (the side of vehicle body 101) farther than the vehicle body side region 93f, the vehicle body side region 93f can be directed to extend in the vertical direction.

In addition, according to the reference example, since the intermediate region 93e extends in the vehicle width direction, it is possible to arrange the in-wheel motor drive device side region 93d at one end side and the vehicle body side region 93f at the other end side to be apart from each other in the vehicle width direction.

In addition, according to the reference example, the one end portion of each of the power lines 93 extending from the power line connecting portion 91 is passed through the sleeve 92. Each sleeve 92 is fixedly inserted into the through hole of the power line connecting portion 91 together with the one end portion of the power line 93 to hold the one end of the power line 93, and seals an annular gap between the power line 93 and the through hole. Hence, it is possible to ensure the water tightness inside the power line terminal box 25b. Further, since each sleeve 92 is arranged to be at least partly superimposed on another sleeve 92 as seen in the direction of the steering axis K, it is possible to arrange the one end portions of all the power lines 93 at substantially the same distance from the steering axis K. Therefore, the stress during steering is not concentrated on the specific power line 93, the lifespan of each of the power lines 93 can be extended.

In addition, according to the reference example, the strut 76 includes the coil spring 78 and a pair of coil spring seats 79b, 79c and is elastic in the direction of the steering axis K. Further, as seen in the direction of the steering axis K, the one end portion of the power line 93 connected to the power line connecting portion 91 is arranged to be superimposed on the lower coil spring seat 79c at a lower side. Specifically, as shown in FIG. 8, one end portion 93a of the power line fits into a projection region 79d of the lower coil spring seat 79c that extends in parallel to the steering axis K. Thus, as seen in the direction of the steering axis K, the one end portion of each power line 93 connected to the corresponding power line connecting portion 91 is superimposed on the lower coil spring seat 79c. Then, by arranging the one end portion 93a of the power line 93 near the steering axis K and arranging also the in-wheel motor drive device side region 93d near the steering axis K, a degree of twist of the in-wheel motor drive device side region 93d can be reduced when the in-wheel motor drive device 10 is steered. Then, the closer the in-wheel motor drive device side region 93d is to the steering axis K, the less the degree of twist can become when the in-wheel motor drive device 10 is steered.

Figure 12:
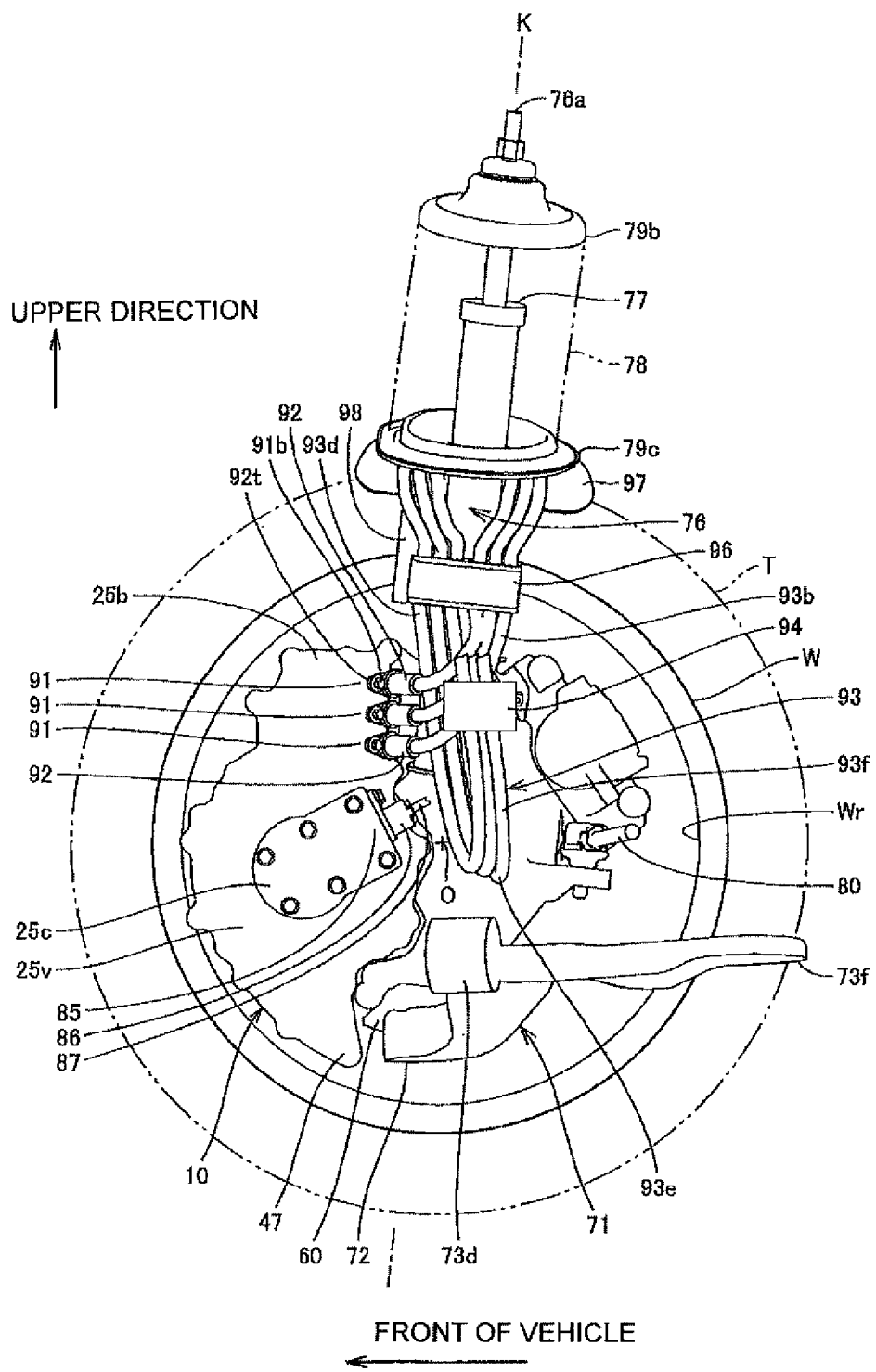
FIG. 12 is a schematic view illustrating an in-wheel motor power line wiring structure of a first embodiment of the present invention in a state seen from inside in the vehicle width direction.
Figure 13:
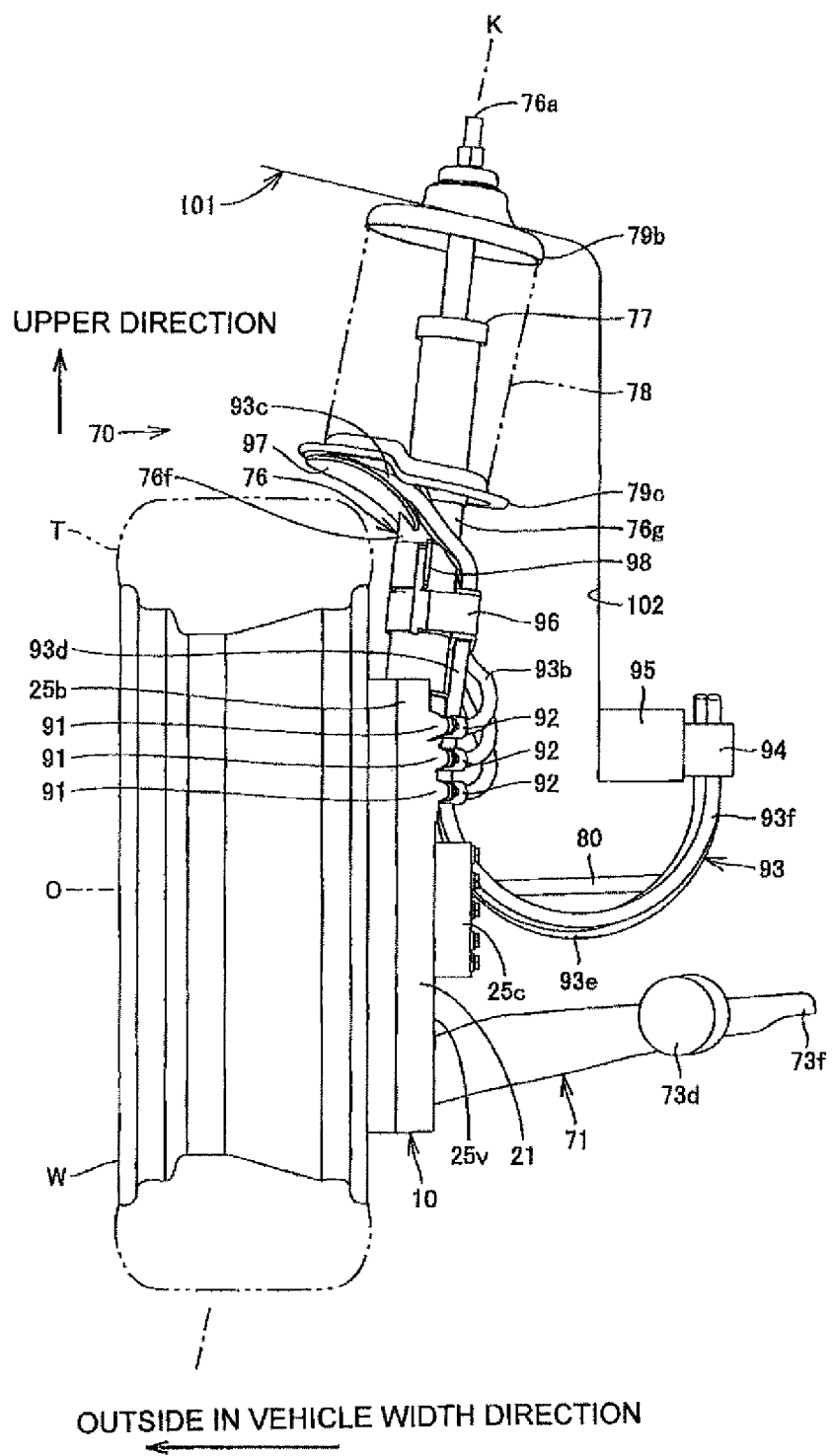
FIG. 13 is a schematic view illustrating the first embodiment in a state seen from the front of the vehicle.
Figure 14:
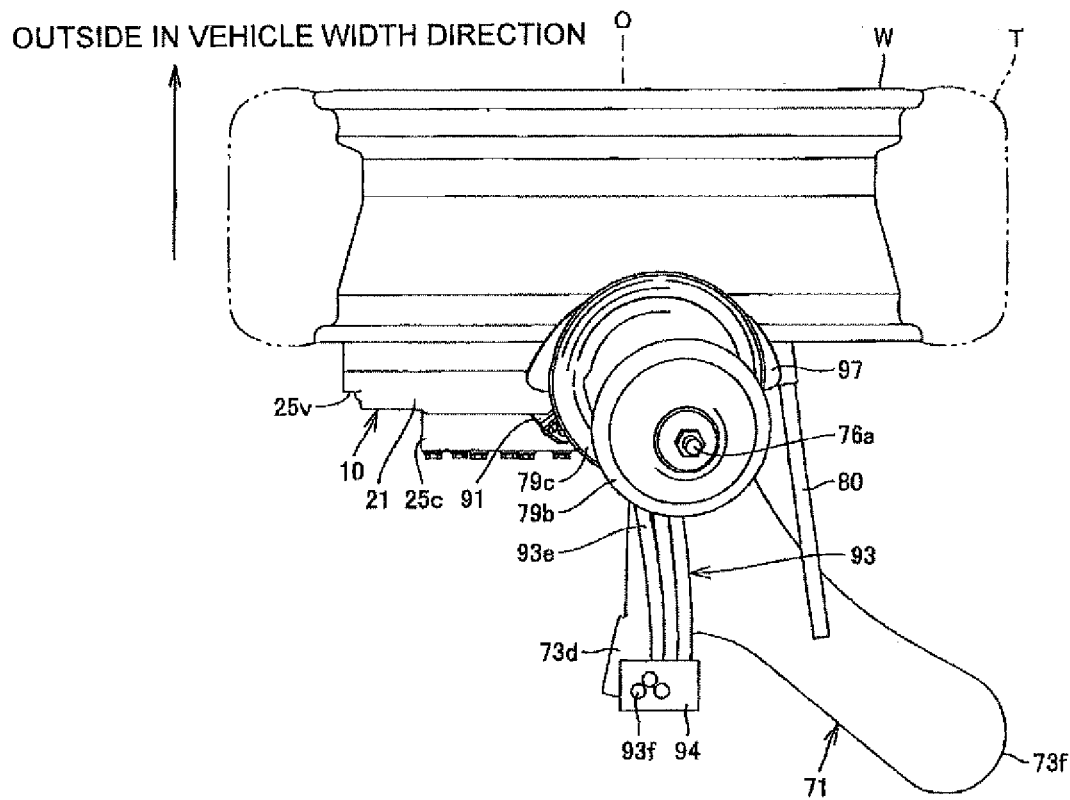
FIG. 14 is a schematic view illustrating the first embodiment in a state seen from the top of the vehicle.

A description of a first embodiment of the present invention will be made hereinafter. FIG. 12 is a schematic view illustrating an in-wheel motor power line wiring structure of a first embodiment of the present invention in a state seen from inside in the vehicle width direction. FIG. 13 is a schematic view illustrating the first embodiment in a state seen from the front of the vehicle. FIG. 14 is a schematic view illustrating the first embodiment in a state seen from the top of the vehicle. In the first embodiment, the same reference numerals are given to its configurations common to those of the above-described reference example without describing the former configurations, and different configurations will be described as follows. In the reference example, the power line 93 is connected at the one end thereof to the power line connecting portion 91 and extends downward from the one end to constitute the in-wheel motor drive device side region 93*d*. On the other hand, in the first embodiment, as shown in FIG. 12 and FIG. 13, the power lines 93 are wired such that each power line 93 extends upward from the power line connecting portion 91 and is bent in an opposite direction at the lower coil spring seat 79*c* to extend downward.

Each power line 93 further includes a wheel vicinity region 93*b* between the one end of the power line 93 at a side of the power line connecting portion 91 and the in-wheel motor drive device side region 93*d*. The wheel vicinity region 93*b*, which extends in the vertical direction to be wired near an upper portion of the tire T, is connected to the side of the power line connecting portion 91 at a lower side, and is connected to the in-wheel motor drive device side region 93*d* at an upper side.

A connecting portion 93*c* between the wheel vicinity region 93*b* and the in-wheel motor drive device side region 93*d* is hooked around the strut 76 to be adjacent to the lower coil spring seat 79*c*. Therefore, the connecting portion 93*c* can be easily bent at a curvature larger than a radius of the strut 76.

A clearance between the power line 93 and the wheel is the shortest at the connecting portion 93*c*.

Hence, a cover 97 is disposed between a tread of the tire T and the connecting portion 93*c*. The cover 97 is fixedly attached to an outer peripheral surface of the strut 76 to support the connecting portion 93*c* from below.

The wheel vicinity region 93*b* and the in-wheel motor drive device side region 93*d* extend along the strut 76 and are held by a clamp member 96 that is fixedly attached to the outer peripheral surface of the strut 76. Therefore, the wheel vicinity region 93*b* and the in-wheel motor drive device side region 93*d* are not bent so that at least a portion from the clamp member 96 to the connecting portion 93*c* is apart from the strut 76. Incidentally, the clamp member 96 binds the plurality of power lines 93 to wire them on an inside surface of the strut 76 in the vehicle width direction and is not provided for constraining the twist of each power line 93. Hence, also in the first embodiment, the in-wheel motor drive device side region 93*d* of each power line 93 can be twisted individually. The in-wheel motor drive device side region 93*d* is wired more outside in the vehicle width direction than the wheel vicinity region 93*b* at a lower side of the clamp member 96, and extends downward beyond the wheel vicinity region 93*b*.

Incidentally, according to the first embodiment, each power line 93 further includes the wheel vicinity region 93*b* between the one end of the power line 93 connected to the power line connecting portion 91 and the in-wheel motor drive device side region 93*d*. The wheel vicinity region 93*b* extends in the vertical direction to be connected to the side of the power line connecting portion 91 at the lower side and to be connected to the in-wheel motor drive device side region 93*d* at the upper side. Hence, it is possible to lengthen the in-wheel motor drive device side region 93*d* relative to that of the reference example, and the degree of twist per unit length of the in-wheel motor drive device side region 93*d* can be relieved when the in-wheel motor drive device 10 is steered.

According to the first embodiment, since the wheel vicinity region 93*b* is held by the clamp member 96 provided on the suspension device 70, the wheel vicinity region 93*b* can be held to extend in the vertical direction.

A description of a protect cover of the power line provided in the first embodiment will be made hereinafter.

An upper portion of the wheel vicinity region 93*b* and an upper portion of the in-wheel motor drive device side region 93*d* which are connected to each other at the connecting portion 93*c* are disposed along a lower surface of the lower coil spring seat 79*c*. Such portions will be referred to as a spring seat vicinity portion 93*s* in the following description. As shown in FIG. 13, the spring seat vicinity portion 93*s* is disposed at a portion of the power line 93 that is the closest to an outer peripheral surface of the wheel (specifically, the tire T). That is, the spring seat vicinity portion 93*s* is disposed between the outer peripheral surface of the tire T of the wheel located below and the lower coil spring seat 79*c* located above.

When the power lines 93 are seen from inside in the vehicle width direction, as shown in FIG. 12, the power lines 93 extend from inside to outside in the vehicle width direction and are hooked around the strut 76 so as to return to inside again. The spring seat vicinity portion 93*s* corresponds to a portion that is hooked around the strut 76. In other words, the spring seat vicinity portion 93*s* corresponds to a portion bent back in a direction of 180°.

The cover 97 is disposed between the outer peripheral surface of the tire T and the spring seat vicinity portion 93*s* to cover the spring seat vicinity portion 93*s* from below. Even if foreign matters such as pebbles are bounced up by the outer peripheral surface of the tire T and fly to the spring seat vicinity portion 93*s* of the power line 93 at a high speed, the spring seat vicinity portion 93*s* is protected from flying of the foreign matters by the cover 97.

As shown in FIG. 13, the strut 76 is arranged more inside in the vehicle width direction than the tire T of the wheel. A lower end region of the strut 76 has a vehicle width direction outside surface 76*f* which faces the wheel and a vehicle width direction inside surface 76*g* which is positioned on an opposite side to the vehicle width direction outside surface 76*f*. The wheel vicinity region 93*b* and the in-wheel motor drive device side region 93*d* are wired along the vehicle width direction inside surface 76*g*. A shielding wall 98 is provided to stand at a boundary between the vehicle width direction outside surface 76*f* and the vehicle width direction inside surface 76*g*. The shielding wall 98 is fixedly attached to the strut 76 between the upper positioned cover 97 and the lower positioned clamp member 96. The shielding wall 98 protrudes in the vehicle front-rear direction from the strut 76 to cover the wheel vicinity region 93*b* and the in-wheel motor drive device side region 93*d*. Thus, the wheel vicinity region 93*b* and the in-wheel motor drive device side region 93*d* are not seen from the tire T at outside in the vehicle width direction.

Figure 15A:
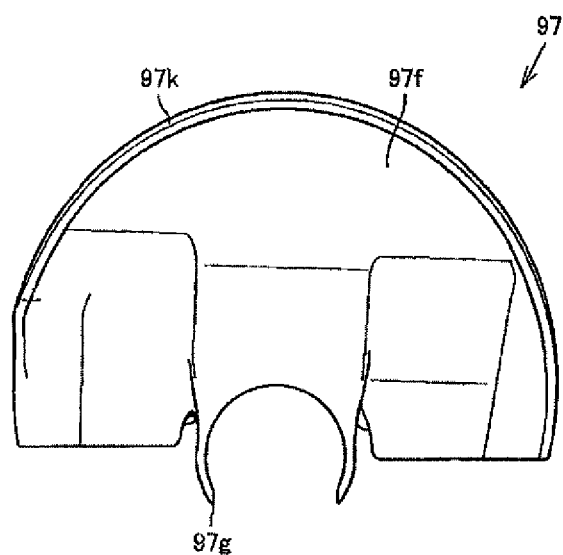
FIG. 15A is a view illustrating a power line protect cover taken out from the first embodiment.
Figure 15B:
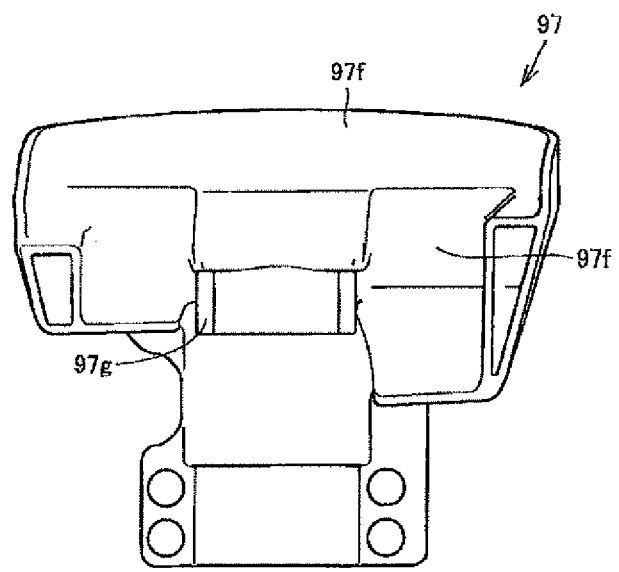
FIG. 15B is a view illustrating the power line protect cover taken out from the first embodiment.
Figure 16A:
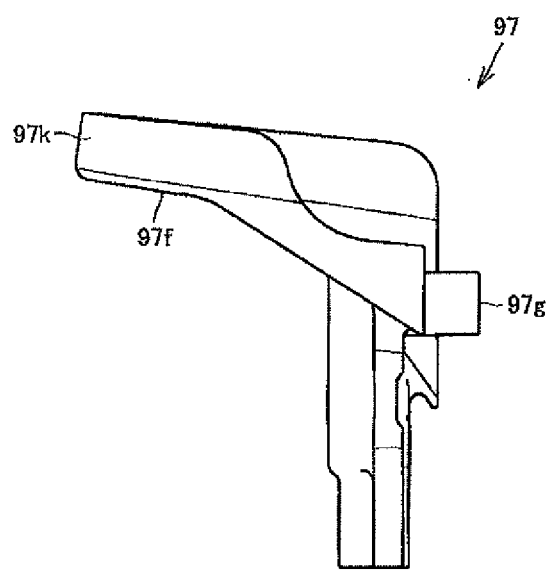
FIG. 16A is a view illustrating the power line protect cover taken out from the first embodiment.

FIG. 15A is a view illustrating the cover 97 taken out from the first embodiment in a state seen from the top. FIG. 15B is a view illustrating the cover 97 taken out from the first embodiment in a state seen from inside in the vehicle width direction. FIG. 16A is a view illustrating the cover 97 taken out in a state seen in the vehicle front-rear direction and corresponds to FIG. 13. The cover 97 has a plate shape portion 97*f*, a grip portion 97*g*, and a peripheral wall portion 97*k*. As shown in FIG. 15A, the plate shape portion 97*f* and the grip portion 97*g* are coupled to integrally. As shown in FIG. 15B, the plate shape portion 97*f* and the peripheral wall portion 97*k* are coupled to integrally. The grip portion 97*g*, as shown in FIG. 13, is disposed between the lower positioned shielding wall 98 and the upper positioned lower coil spring seat 79*c* and is fixedly attached to the strut 76. As shown in FIG. 13 and FIG. 16A, the plate shape portion 97*f* extends slantingly outward in the vehicle width direction and upward from the grip portion 97g, so that a surface of the plate shape portion 97f is slant.

The plate shape portion 97f of the cover 97 is a shape like a semicircular shape corresponding to a half of the lower coil spring seat 79c and has an are-shaped edge and straight edges. The peripheral wall portion 97k is provided to stand on the arc-shaped edge. The plate shape portion 97f is provided to be superimposed on the lower surface of the lower coil spring seat 79c for covering at least an outer half of the lower coil spring seat 79c in the vehicle width direction. The peripheral wall portion 97k protrudes upward from an upper surface of the plate shape portion 97f to be in contact with an outer peripheral edge of the lower coil spring seat 79c. Thus, the lower coil spring seat 79c, the peripheral wall portion 97k, and the plate shape portion 97f, as walls on three sides, define a space that accommodates the spring seat vicinity portion 93s of the power line 93.

Figure 16B:
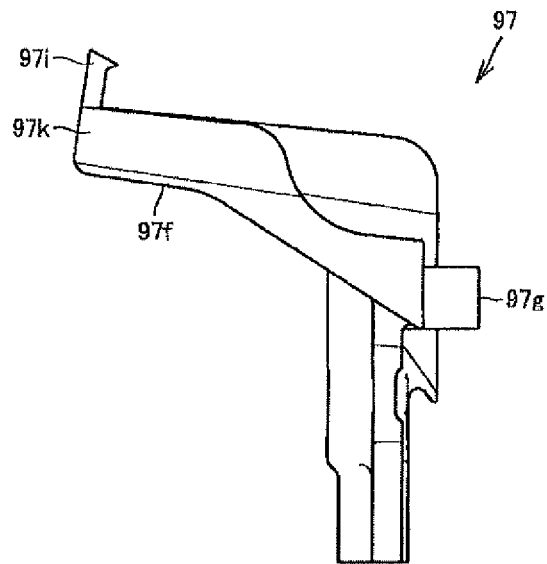
FIG. 16B is a view illustrating a taken-out power line protect cover of a modification.

The peripheral wall portion 97k shown in FIG. 16A is disposed to simply stand close to the outer peripheral edge of the lower coil spring seat 79c. Alternatively, according to the cover 97 of a modification shown in FIG. 16B, a claw 97i is provided on the peripheral wall portion 97k. The claw 97i protrudes from an upper surface of the plate shape portion 97f. The claw 97i is engaged with a hole (not shown) formed on the edge of the lower coil spring seat 79c.

The grip portion 97g is provided on the straight edges of the plate shape portion 97f of the cover 97. The grip portion 97g is formed into a C shape and is fixedly attached to the strut 76 at an upper side of the clamp member 96 to hold at least the vehicle width direction outside surface 76f of the strut 76 with the C-letter.

The plurality of power lines 93 are wired along an upper surface of the cover 97 between the lower positioned cover 97 and the upper positioned lower coil spring seat 79c. The upper surface of the cover 97 is formed in a flat surface or a curved surface with no unevenness as shown in FIGS. 15A and 15B.

Figure 17:
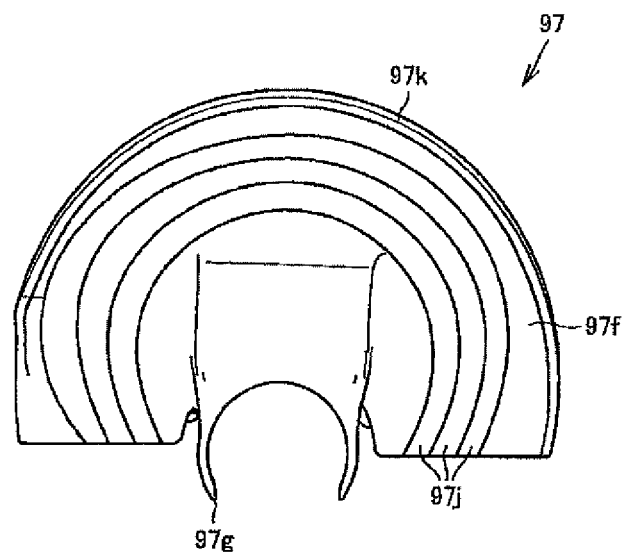
FIG. 17 is a view illustrating a taken-out power line protect cover of another modification.

Making some additional remarks here, unevenness that restricts the power line 93 from moving may be formed on the upper surface of the cover 97 instead of the embodiment shown in FIGS. 15A and 15B. A modification of the cover 97 is shown in FIG. 17. On the upper surface of the cover 97 of the modification, a plurality of grooves 97j that extend to be curved around the grip portion 97g are formed. Each groove 97j receives the spring seat vicinity portion 93s of the corresponding power line 93 to arrange the spring seat vicinity portion 93s along the upper surface of the cover 97.

Incidentally, the first embodiment includes: the wheel that includes the road wheel W and the tire T; the in-wheel motor drive device 10 disposed inside the road wheel W to drive the road wheel W; the strut 76 as the suspension member which extends in the vertical direction, which has the upper end as one end and the lower end as the other end, the one end is coupled to the vehicle body 101 at a more outer radial side than the wheel and the other end is coupled to the in-wheel motor drive device 10; the lower coil spring seat 79c that is provided on the strut 76, positioned away from the outer peripheral surface of the wheel, and supports the end portion of the spring 78; the power lines 93 extending from the in-wheel motor drive device 10 to the vehicle body 101 through a space between the lower coil spring seat 79c and the outer peripheral surface of the wheel; and the cover 97 covering the spring seat vicinity portion 93s of the power line 93 disposed between the lower coil spring seat 79c and the outer peripheral surface of the wheel. In such a way, the cover 97 is provided between the outer peripheral surface of the lower positioned wheel (tire T) and the upper positioned spring seat vicinity portion 93s to protect the spring seat vicinity portion 93s of the power line 93. Therefore, even if the foreign matters such as the pebbles are bounced up by the outer peripheral surface of the wheel and fly to the spring seat vicinity portion 93s at a high speed, the foreign matters do not collide with the spring seat vicinity portion 93s.

Figure 18:
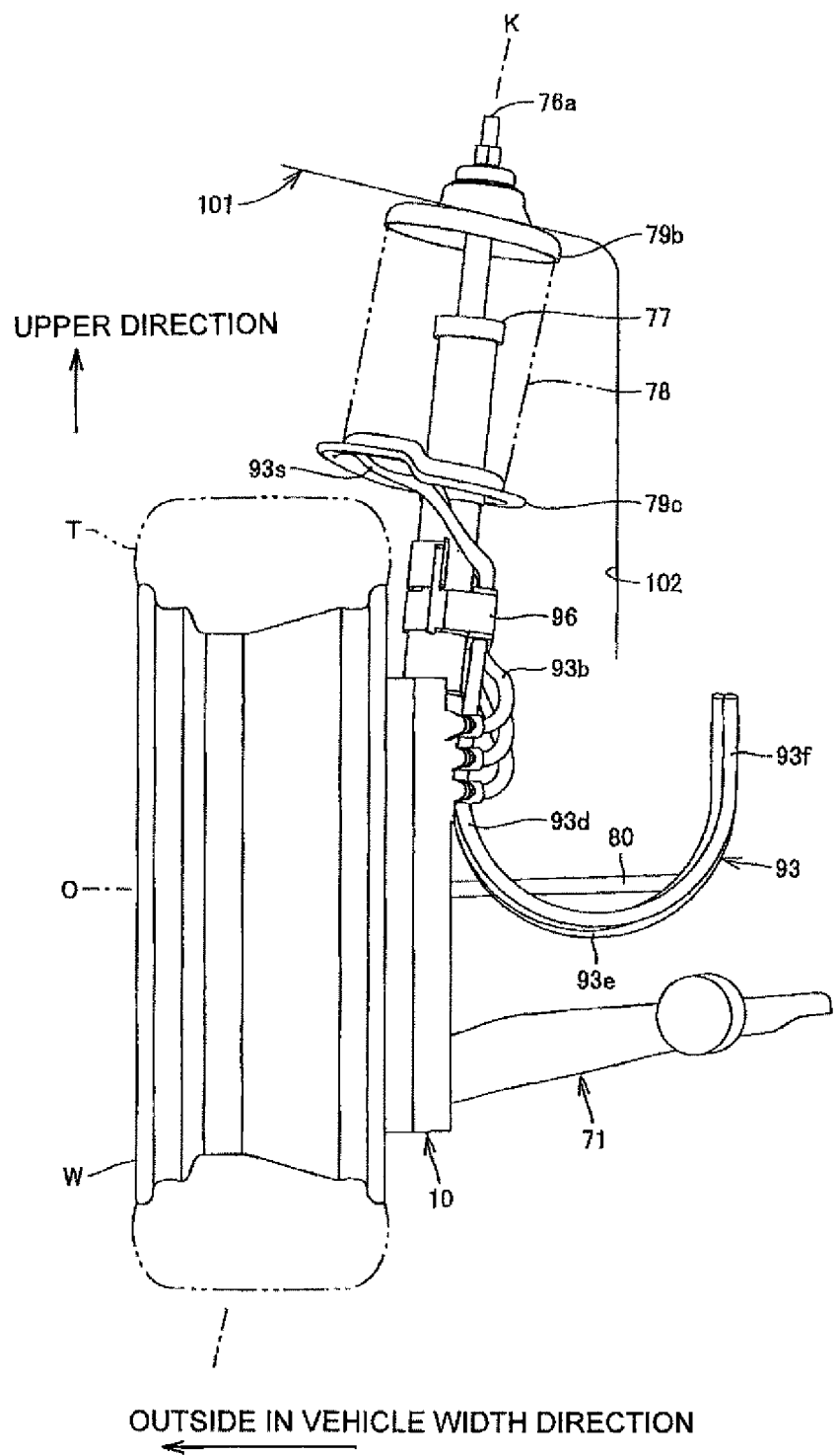
FIG. 18 is a schematic view illustrating an in-wheel motor power line wiring structure of another reference example in a state seen from the front of the vehicle.

For comparison, an in-wheel motor power line wiring structure as a reference example is shown in FIG. 18. A state seen from the front of the vehicle is shown in the reference example of FIG. 18. In the reference example, the cover is not provided between the outer peripheral surface of the lower positioned wheel (tire T) and the upper positioned spring seat vicinity portion 93s. Therefore, the spring seat vicinity portion 93s faces the outer peripheral surface of the wheel, that is, the tire T. In the reference example, the foreign matters such as the pebbles that are bounced up by the outer peripheral surface of the tire T collide with the spring seat vicinity portion 93s, so that the power line may be damaged.

Referring back to the description of the first embodiment, the strut 76 is arranged more inside in the vehicle width direction than the wheel. The lower end region of the strut 76 has the vehicle width direction outside surface 76f as one side surface which faces the wheel and the vehicle width direction inside surface 76g as the other side surface which is positioned on the opposite side to the vehicle width direction outside surface 76f. The wheel vicinity region 93b of the power line 93 from the one end portion connected to the in-wheel motor drive device 10 to the spring seat vicinity portion 93s is wired along the vehicle width direction inside surface 76g of the strut 76. Thus, the strut 76 can be interposed between the wheel and the wheel vicinity region 93b, so that it is difficult for the foreign mattes flying from the wheel to collide with the wheel vicinity region 93b.

In addition, according to the first embodiment, since the shielding wall 98 is provided to stand at the boundary between the vehicle width direction outside surface 76f and the vehicle width direction inside surface 76g in the lower end region of the strut 76, it is further difficult for the foreign mattes flying from the wheel to collide with the wheel vicinity region 93b.

In addition, according to the first embodiment, since the cover 97 includes the plate shape portion 97f formed into the shape corresponding to the half of the lower coil spring seat 79c and the plate shape portion 97f covers not less than the half of the lower coil spring seat 79c, the spring seat vicinity portion 93s that is wired between the plate shape portion 97f and the lower coil spring seat 79c can be certainly protected.

In addition, according to the first embodiment, the cover 97 further includes the C-shaped grip portion 97g formed at the edge of the plate shape portion 97f, and the grip portion 97g is fixedly attached to the strut 76 to hold the side surface of the strut 76. Thus, the cover 97 that is in cooperation with the strut 76 can protect the power lines 93.

In addition, according to the first embodiment, the plate shape portion 97f and the lower coil spring seat 79c are provided with the claw and the hole, respectively. Since the claw and the hole engage with each other as an engaging portion and an engaged portion, the plate shape portion 97f is coupled to the lower coil spring seat 79c. Even if a downward force acts on the plate shape portion 97f from the power line 93, the plate shape portion 97f is not deformed or the plate shape portion 97f does not approach the outer peripheral surface of the tire T of the wheel.

In addition, according to the modification shown in FIG. 17, on the upper surface of the plate shape portion 97f, the grooves 97j each of which receives the spring seat vicinity portion 93s of the corresponding power line 93 to arrange the spring seat vicinity portion 93s along the upper surface of the plate shape portion 97f are formed. Thus, the three spring seat vicinity portions 93s are received along the same number of grooves 97j, respectively to be able to hold the spring seat vicinity portion 93s. Since each groove 97j extends to be curved around the grip portion 97g, the plurality of spring seat vicinity portions 93s can be concentrically aligned around the grip portion 97g.

A description of the clamp member of the power line provided in the first embodiment will be made hereinafter.

The clamp member 96, as shown in FIG. 13, is disposed closer to the inside of the strut 76 in the vehicle width direction to hold the plurality of power lines extending in the vertical direction as shown in FIG. 12. Specifically, the clamp member 96 holds the three wheel vicinity regions 93b and the three in-wheel motor drive device side regions 93d. The shock absorber 77 that is provided at the upper end region of the strut 76 is a combination of the damper and the spring 78. The damper is provided in the upper end region of the strut 76.

Figure 19:
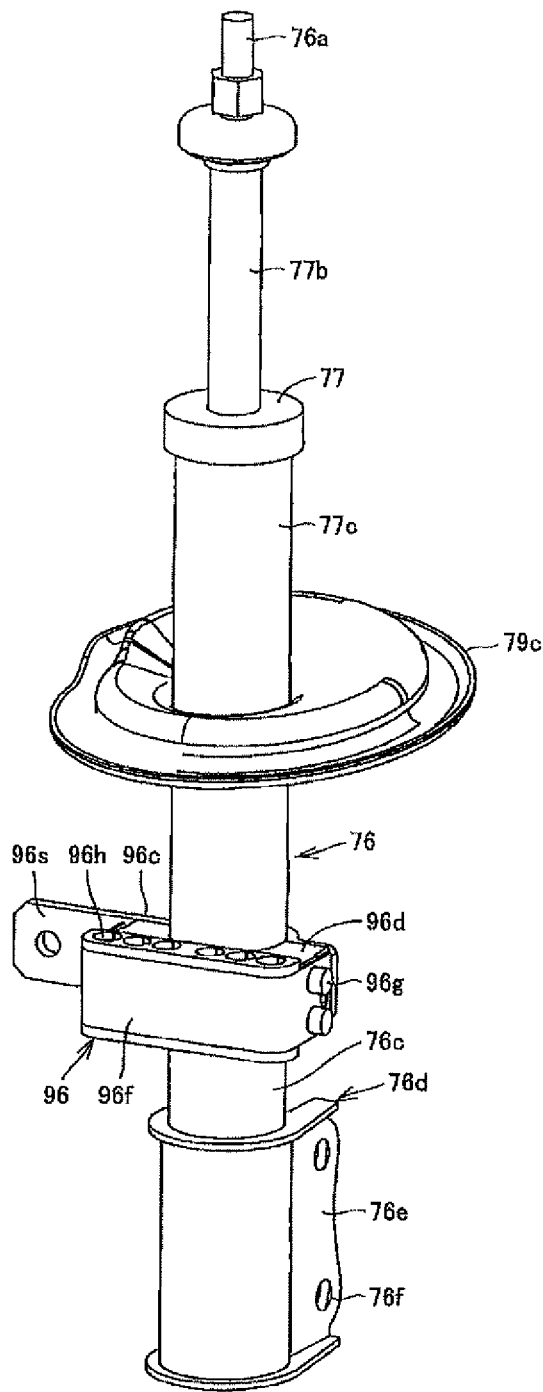
FIG. 19 is a perspective view illustrating a strut and a clamp member taken out from the first embodiment.

FIG. 19 is a perspective view illustrating the strut and the clamp member taken out from the first embodiment. The clamp member 96 has a plurality of through holes 96h penetrating the clamp member 96 in the vertical direction, and each of the power lines 93 is passed through the corresponding through hole 96h. Thus, each of the power lines 93 is held to extend in the vertical direction. The damper includes an upper positioned rod 77b and a lower positioned cylindrical shaft portion 77c, and the shaft portion 77c slidably receives the rod 77b. When the in-wheel motor drive device 10 coupled to the lower end of the strut 76 bounces and rebounds in the vertical direction with the result that the shaft portion 77c reciprocates with respect to the rod 77b, the damper attenuates the reciprocating motion of the shaft portion 77c by its own viscoelasticity.

The lower coil spring seat 79c and the clamp member 96 are provided on the side surface of the shaft portion 77c. A damper bracket 76d is provided at a lower end portion of the shaft portion 77c, that is, the lower end portion 76c of the strut 76. The damper bracket 76d is fixed to the lower end of the shaft portion 77c and extends downward relative to the shaft portion 77c. The damper bracket 76d includes a plate shape in-wheel motor coupling portion 76e projecting in an outer radial direction of the shaft portion 77c. Through holes 76f are formed on the in-wheel motor coupling portion 76e. A bolt not shown penetrates through each of the through holes 76f and a shaft portion of the bolt is screwed into a female screw hole not shown that is formed in the in-wheel motor drive device 10, so that the damper bracket 76d is fixedly attached to the in-wheel motor drive device 10.

The clamp member 96 is disposed above the damper bracket 76d. The lower coil spring seat 79c is disposed above the clamp member 96.

Figure 21:
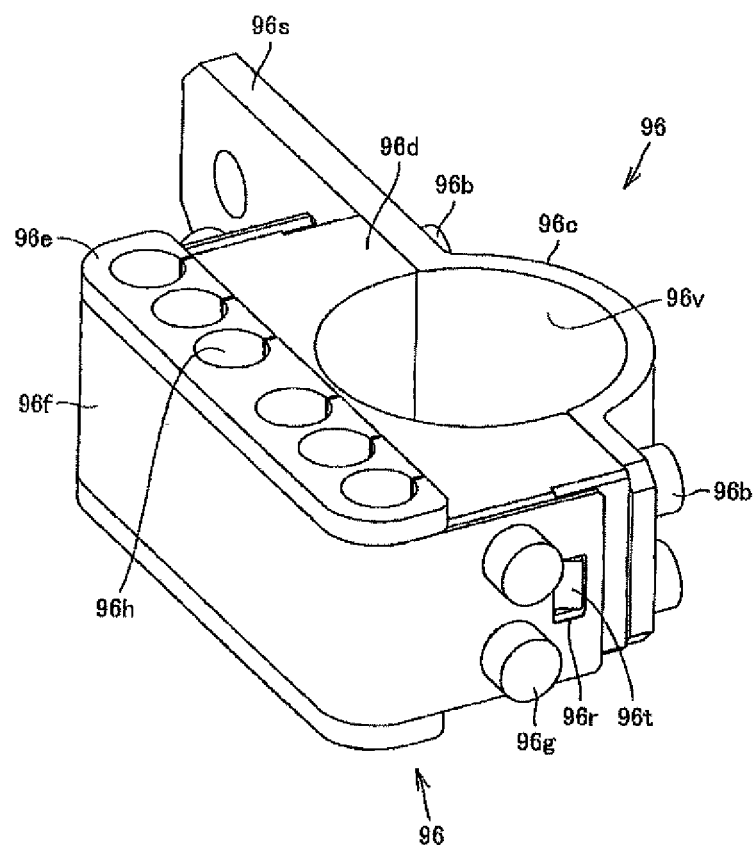
FIG. 21 is a perspective view illustrating the clamp member taken out from the first embodiment.
Figure 22:
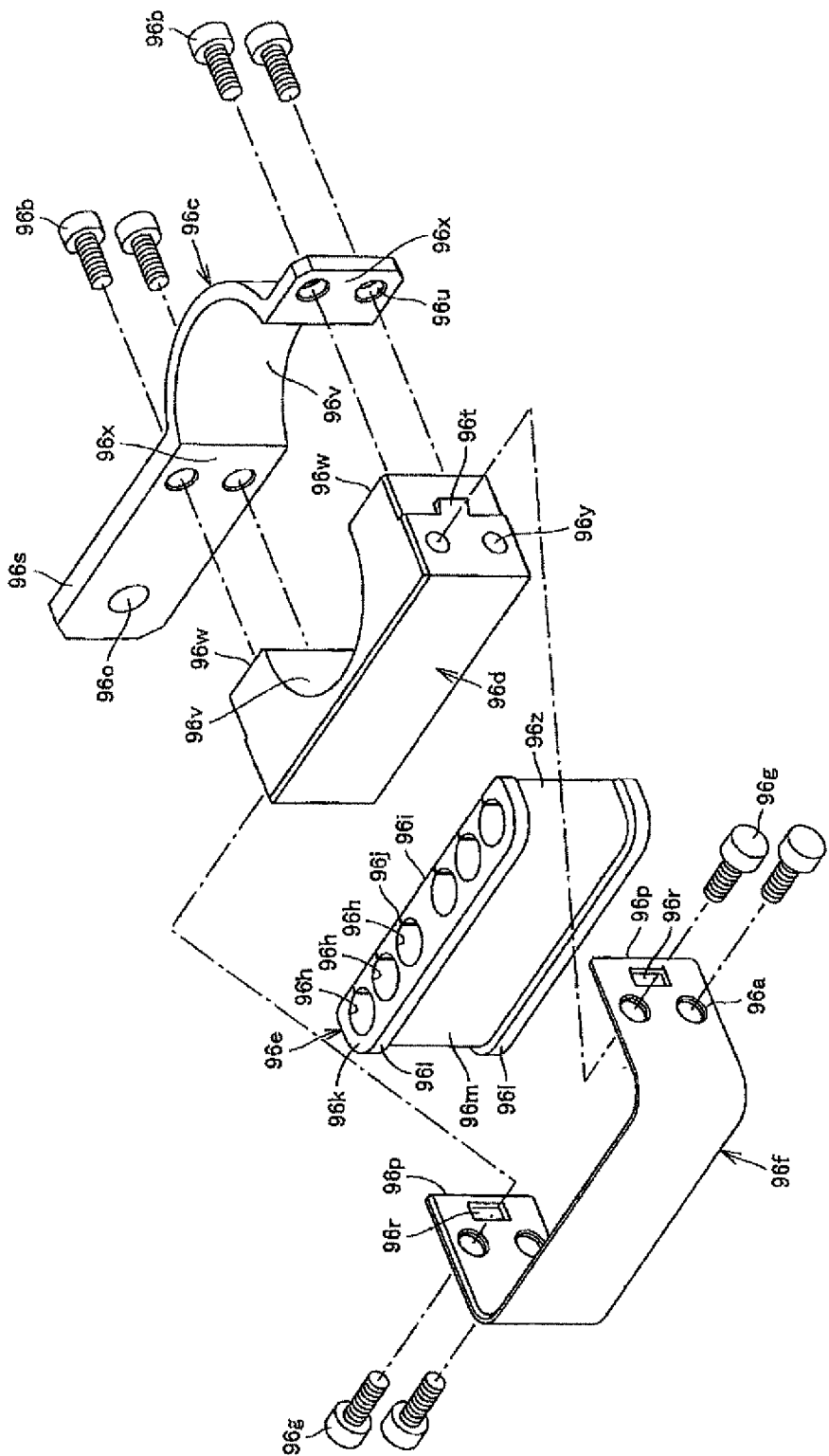
FIG. 22 is an exploded perspective view of the clamp member.

FIG. 21 is a perspective view illustrating the clamp member taken out from the first embodiment.
FIG. 22 is an exploded perspective view of the clamp member, which corresponds to FIG. 21. The clamp member 96 includes a pair of base members 96c, 96d, a block 96e, and a wall member 96f.

The base member 96c, as one of the base members, is formed by bending a band steel member and a ball joint coupling portion 96s is formed at one end of the base member 96c. A hole 96o for receiving a ball stud is formed in the ball joint coupling portion 96s. The ball joint coupling portion 96s will be described in detail together with a stabilizer described later. Between both ends of the base member 96c, a hemicylindrical recess portion 96v for receiving the shaft portion 77c at the lower end of the damper is formed. On both end portions 96x of the both ends of the base member 96c that are positioned to sandwich the hemicylindrical recess portion 96v, a plurality of through holes 96u are respectively formed.

The other base member 96d is basically a rectangular parallelepiped block that includes one side surface on which a hemicylindrical recess portion 96v is formed. The other side surface of the rectangular parallelepiped is formed in flat. On both end portions 96w of the one side surface of the base member 96d that are positioned to sandwich the hemicylindrical recess portion 96v, a plurality of female screw holes not shown are respectively formed. The base member 96d is made of resin or light metal including aluminum or the like.

While the shaft portion 77c at the lower end of the damper is received in the hemicylindrical recess portion 96v of one base member 96c, the hemicylindrical recess portion 96v of the other base member 96d receives the shaft portion 77c at the lower end of the damper, then, after bringing the both end portions 96x of one base member 96c into contact with the both end portions 96w of the other base member 96d, bolts 96b are passed through the through holes 96u of the both end portions 96x, and after that, a shaft portion of each of the bolts 96b is screwed into the female screw hole of the both end portions 96w, so that the pair of base members 96c, 96d are fixedly attached to the shaft portion 77c at the lower end of the damper.

A block 96e, which is an elastic member made of rubber or sponge, includes the plurality of through holes 96h. The number of the through holes 96h is six, and the six through holes 96h are arranged in parallel with a space each other from one end to the other end of the block 96e. A slit 96j is provided from one side surface 96i of the block 96e to each of the through holes 96h. A pair of collar portions 96l, 96l are respectively formed at both end opening vicinities 96k of each of the through holes 96h. The pair of collar portions 96l extend in parallel each other from the one end of the block 96e to the other end of the block 96e through the other side surface of the block 96e. For this reason, a wide groove 96m is formed between the collar portions 96l, 96l. The wide groove 96m continually extends along one end surface 96z of the block 96e, the other side surface of the block 96e, and the other end surface of the block 96e.

The wall member 96f, which is formed by bending a band steel member, includes a pair of end wall portions 96p, 96p which face each other in the horizontal direction, and an intermediate wall portion that extends in the horizontal direction from an edge of one end wall portion 96p to an edge of the other end wall portion 96p. The wall member 96f is formed into a shape corresponding to that of the above described wide groove 96m. On each of the end wall portions 96p, round holes 96a and an elongated hole 96r are formed to pass through the end wall portions 96p. On the other hand, on both end surfaces of the other base member 96d described above, female screw holes 96y and claws 96t are formed, respectively. Arrangements of the female screw holes 96y and the claws 96t correspond to arrangements of the round holes 96a and the elongated holes 96r of the wall member 96f.

The power line 93 passes through the corresponding through hole 96h by spreading each slit 96j of the above described block 96e. When the block 96e returns to its original shape, each slit 96j is closed. In a state in which the plurality of power lines 93 are gripped by the common block 96e, the one side surface of the block 96e is brought into contact with the flat other side surface of the base member 96d and after that the wall member 96f is placed on the wide groove 96m of the other side surface of the block 96e, so that each of the round holes 96a of the wall member 96f is fit to the female screw hole 96y of the base member 96d as well as each of the elongated holes 96r of the wall member 96f is engaged with the claw 96t of the base member 96d. Under such a state, by passing the bolt 96g through each of the round holes 96a of the wall member 96f and screwing a shaft portion of the bolt 96g into each of the female screw holes 96y of the base member 96d, the wall member 96f is fixedly attached to the base member 96d. The block 96e is held by the wall member 96f and restrained from falling down from the base member 96d to assemble the clamp member 96 as shown in FIG. 21. At the same time, the single clamp member 96 holds the plurality of power lines 93. As shown in FIG. 12, each of the plurality of power lines 93 can be divided into the wheel vicinity region 93b and the in-wheel motor drive device side region 93d, the wheel vicinity region 93b extending in the vertical direction, being connected to the side of the in-wheel motor drive device 10 at the lower side, and being connected to the side of the vehicle body 101 at the upper side, the in-wheel motor drive device side region 93d extending in the vertical direction, being connected to the side of the in-wheel motor drive device 10 at the upper side, and being connected to the side of the vehicle body 101 at the lower side. The clamp member 96, which is an assembly member common to the plurality of power lines 93, holds the plurality of wheel vicinity regions 93b and the plurality of in-wheel motor drive device side regions 93d together.

A further description of an arrangement of the clamp member 96 is that as shown in FIG. 12, as seen in the direction of the axis O, that is, the axle direction, the clamp member 96 is arranged to be superimposed on the rim portion Wr of the road wheel W. In addition, the clamp member is arranged to be superimposed on the steering axis K.

Figure 20:
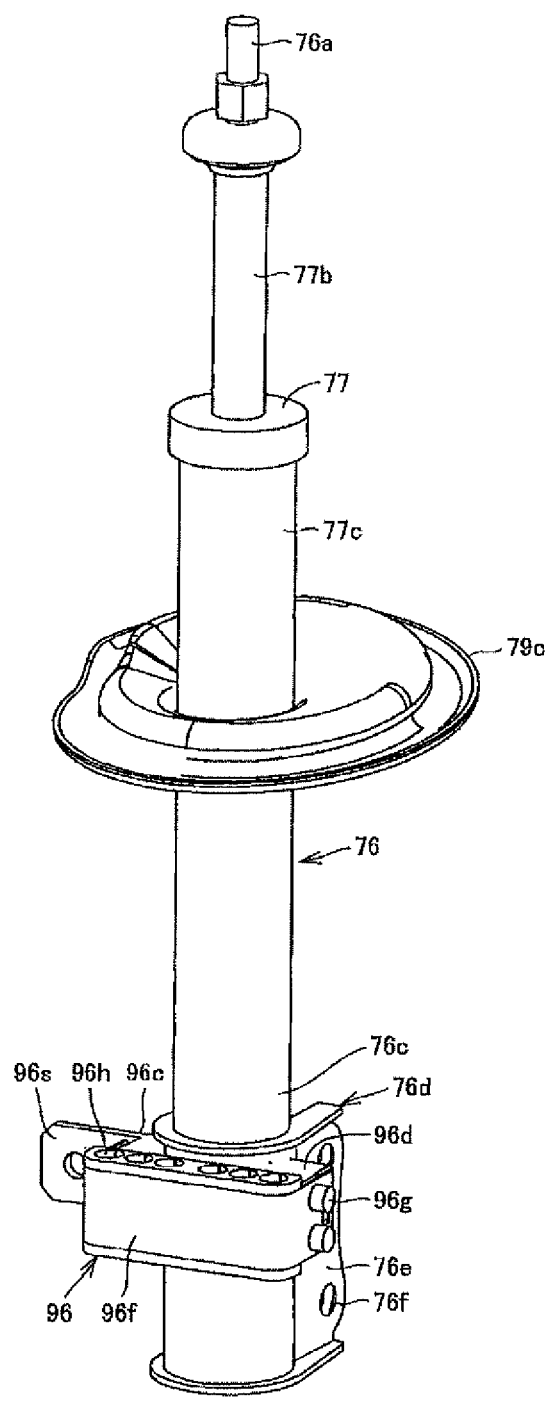
FIG. 20 is a perspective view illustrating a modification of a structure shown in FIG. 19.

An arrangement place of the clamp member 96 is as shown in FIG. 19 as described above, but it is not limited thereto. The clamp member 96 may be provided on the damper bracket 76d as a modification shown in FIG. 20. In the modification, the base member 96c may be coupled to the damper bracket 76d integrally, otherwise, the base member 96c may be fixedly attached to the damper bracket 76d as another member.

Figure 23:
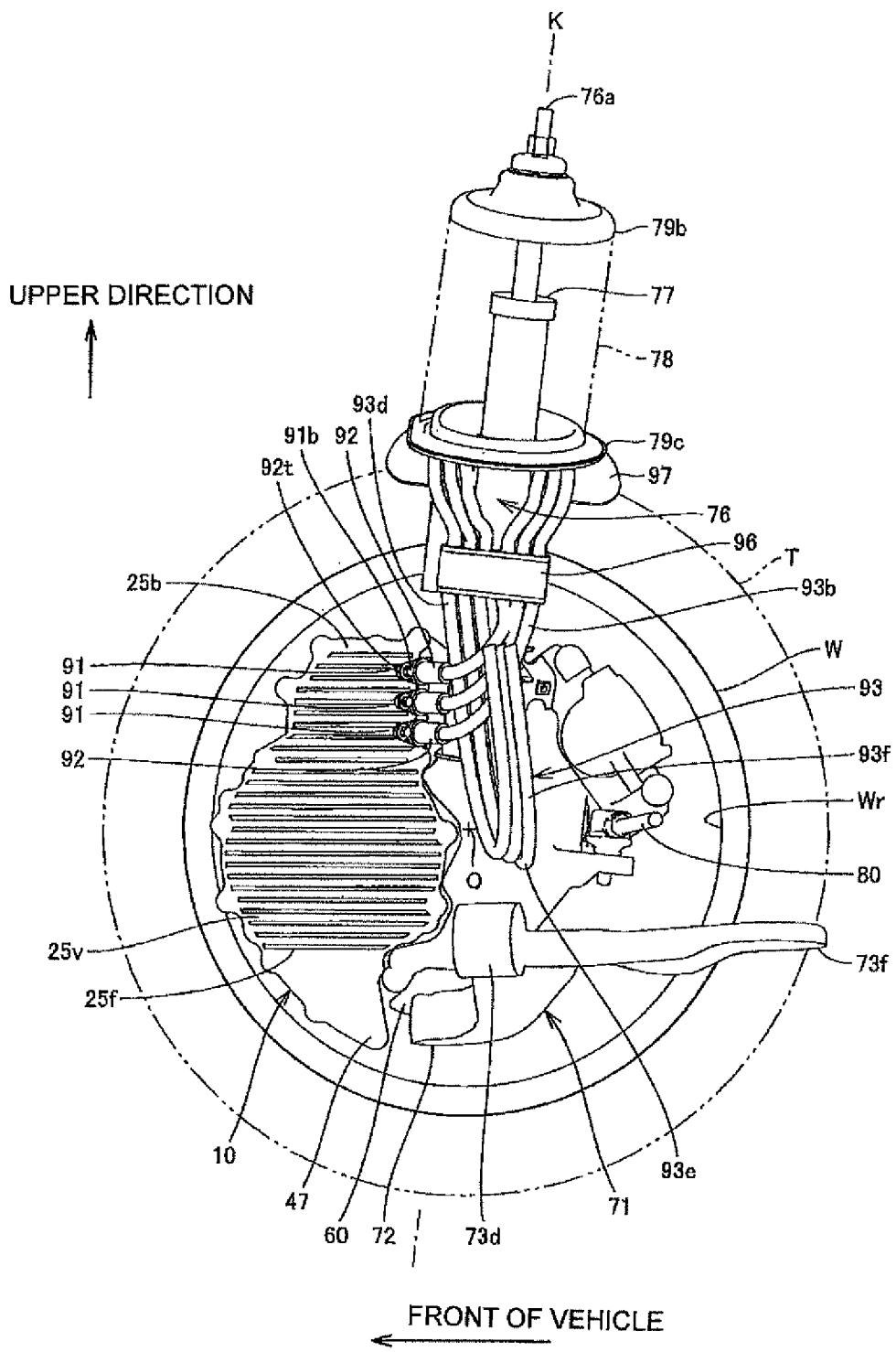
FIG. 23 is a schematic view illustrating an in-wheel motor power line wiring structure of a second embodiment of the present invention in a state seen from inside in the vehicle width direction.
Figure 24:
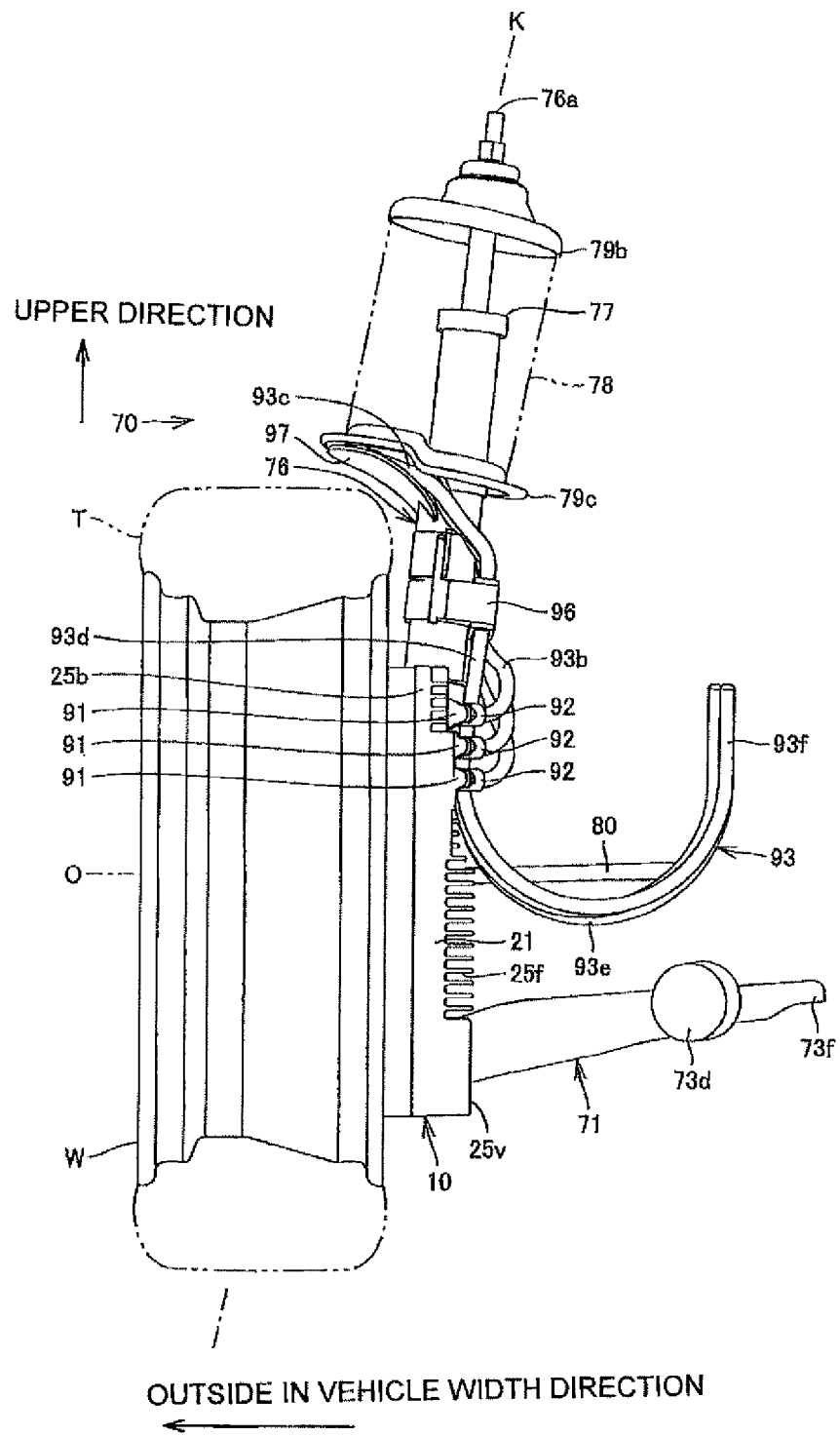
FIG. 24 is a schematic view illustrating the second embodiment in a state seen from the front of the vehicle.
Figure 25:
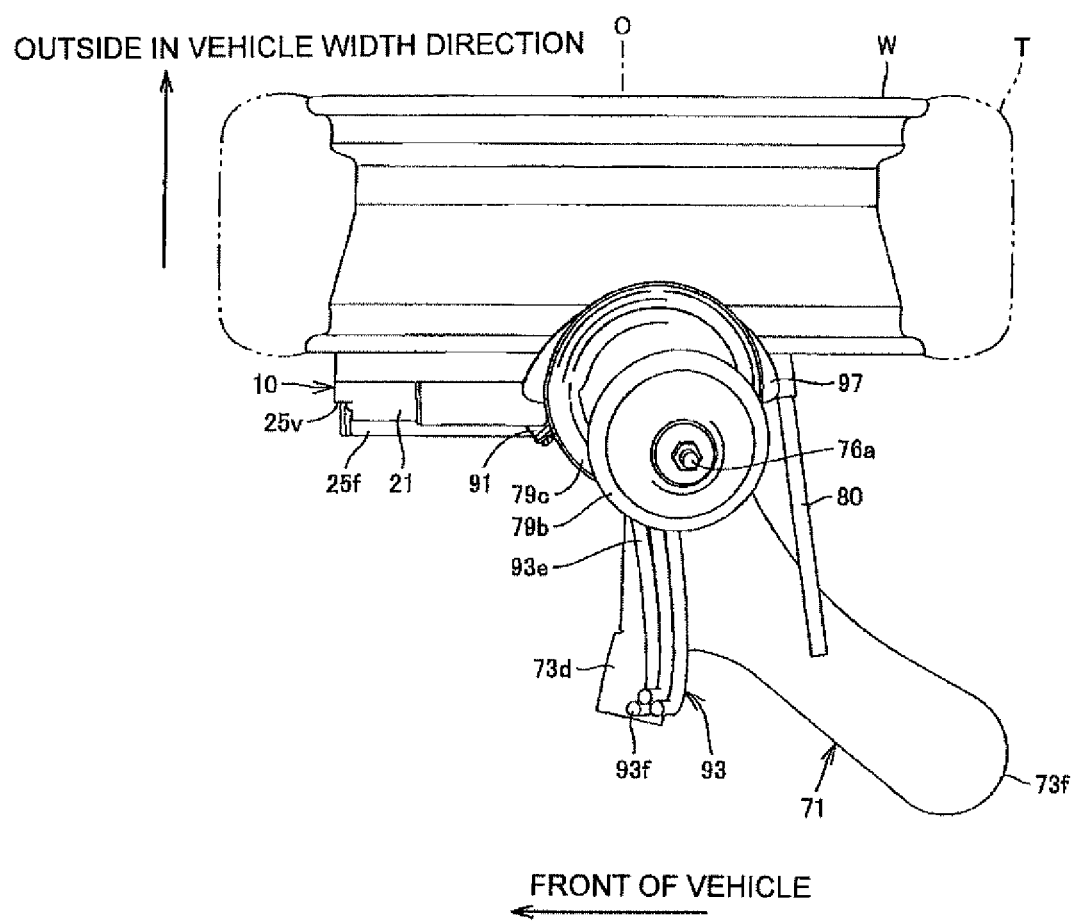
FIG. 25 is a schematic view illustrating the second embodiment in a state seen from the top of the vehicle.

A description of a second embodiment of the present invention will be made hereinafter. FIG. 23 is a schematic view illustrating an in-wheel motor power line wiring structure of the second embodiment of the present invention in a state seen from inside in the vehicle width direction. FIG. 24 is a schematic view illustrating the second embodiment in a state seen from the front of the vehicle. FIG. 25 is a schematic view illustrating the second embodiment in a state seen from the top of the vehicle. In the second embodiment, the same reference numerals are given to its configurations common to those of the above-described embodiment without describing the former configurations, and different configurations will be described as follows. In the first embodiment described above, the signal line terminal box 25c is provided to protrude inside in the vehicle width direction from the motor casing cover 25v. On the other hand, in the second embodiment, the signal line terminal box 25c is provided in the motor unit 21 not to protrude. Then, radiation fins 25f are provided on a substantially entire surface of a surface of the motor casing cover 25v constituting an end surface of the motor unit 21 and an inner end surface of the in-wheel motor drive device 10 in the vehicle width direction. The radiation fins 25f are also formed on the power line terminal box 25b.

A large number of radiation fins 25f are provided to extend straight in the vehicle front-rear direction and to stand with a space each other in the vertical direction. When the electric vehicle travels, a traveling wind flows smoothly between a large number of radiation fins 25f, 25f arranged in parallel each other. Therefore, cooling efficiency of the motor unit 21 is improved.

Figure 26:
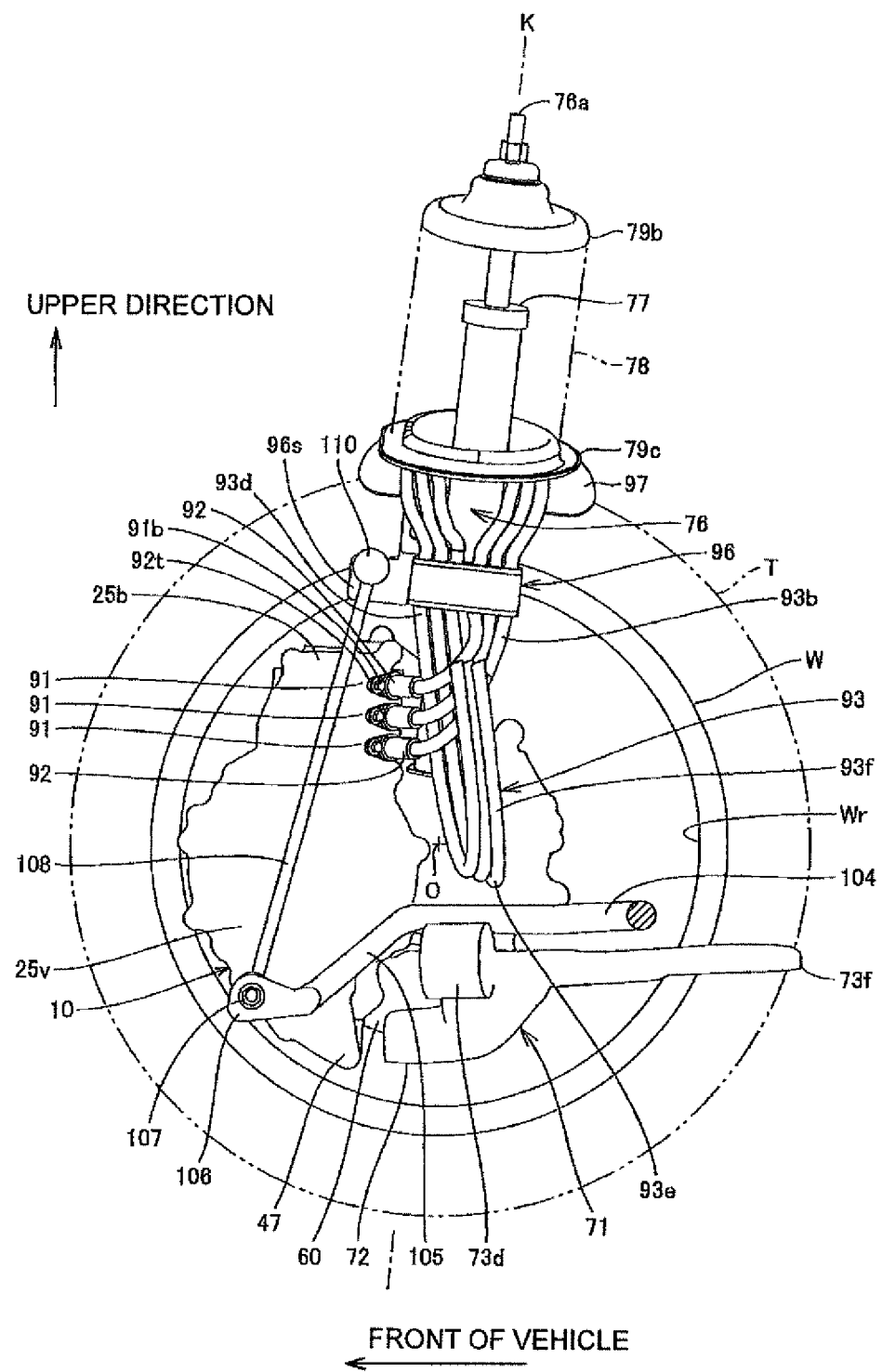
FIG. 26 is a schematic view illustrating an in-wheel motor power line wiring structure of a third embodiment of the present invention in a state seen from inside in the vehicle width direction.
Figure 27:
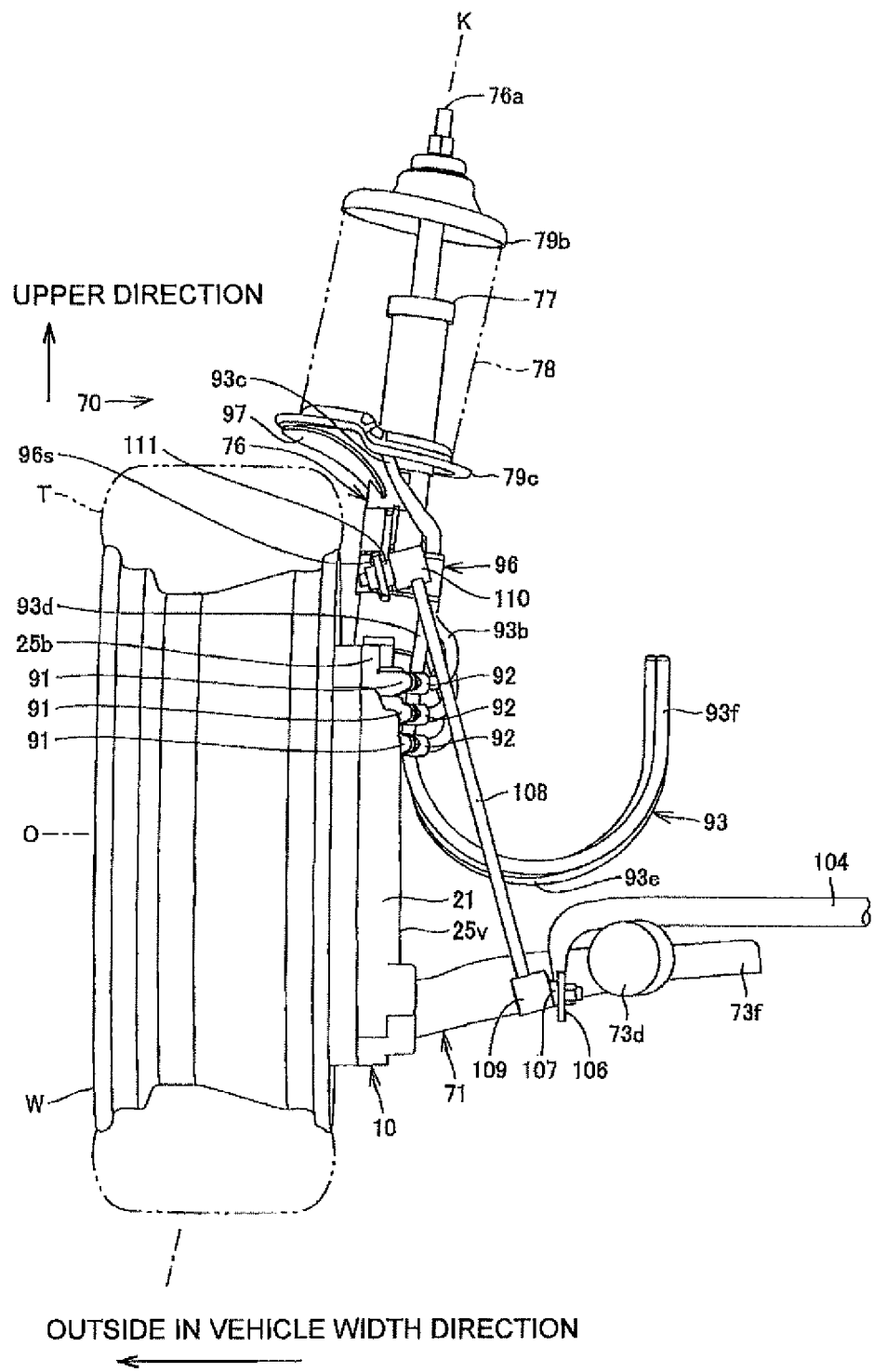
FIG. 27 is a schematic view illustrating the third embodiment in a state seen from the front of the vehicle.
Figure 28:
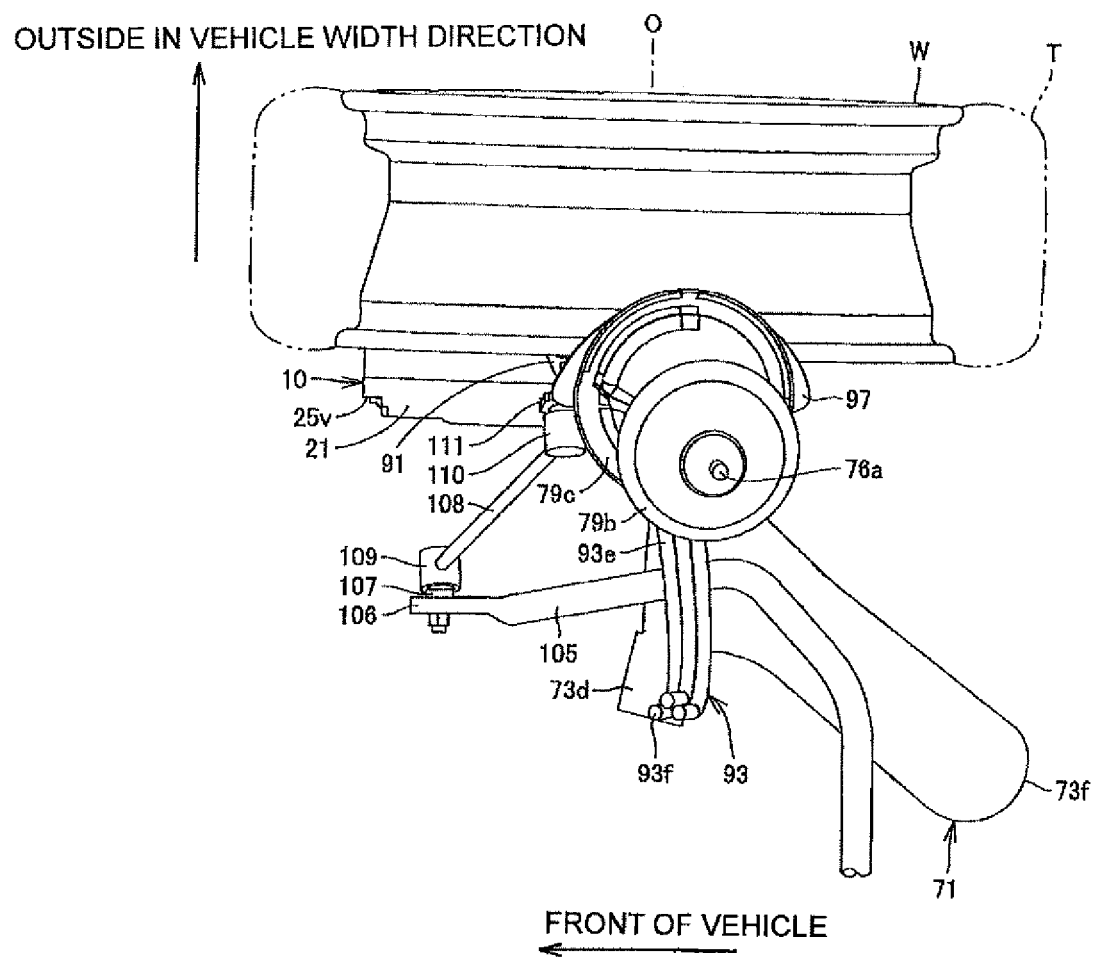
FIG. 28 is a schematic view illustrating the third embodiment in a state seen from the top of the vehicle.

A description of a third embodiment of the present invention will be made hereinafter. FIG. 26 is a schematic view illustrating an in-wheel motor power line wiring structure of the third embodiment of the present invention in a state seen from inside in the vehicle width direction. FIG. 27 is a schematic view illustrating the third embodiment in a state seen from the front of the vehicle. FIG. 28 is a schematic view illustrating the third embodiment in a state seen from the top of the vehicle. In the third embodiment, the same reference numerals are given to its configurations common to those of the above-described embodiment without describing the former configurations, and different configurations will be described as follows. In the third embodiment, a stabilizer and a pair of stabilizer links are additionally provided to the first embodiment describe above.

In the third embodiment, the in-wheel motor drive devices 10, the suspension device 70, the damper built-in type struts 76, the power lines 93, the clamp members 96, and the stabilizer links 108, which make pair respectively, are provided on both sides of the vehicle body 101 in the vehicle width direction. Each of these pairs is symmetrically disposed with respect to a reference plane of the electric vehicle which passes through a center in the vehicle width direction of the vehicle body 101 and expands in the vehicle front-rear direction and the vertical direction. A pair of stabilizer links 108 extend in the vertical direction.

The stabilizer 104 extends in the vehicle width direction, and both ends 105 change their extending directions to extend toward the front of the vehicle. One end 106 of the stabilizer 104 is coupled to a lower end 109 of one of the stabilizer links 108 through a ball joint 107. Similarly, the other end of the stabilizer 104 is coupled to a lower end 109 of the other stabilizer link 108 through a ball joint. Specifically, a socket for accommodating a ball portion of the ball joint 107 freely in every direction is formed at the lower end 109, and a ball stud of the ball joint 107 is fixedly attached to the one end 106 of the stabilizer 104.

An upper end 110 of the stabilizer link 108 is coupled to the clamp member 96 through a ball joint 111. Specifically, a socket for accommodating a ball portion of the ball joint 111 freely in every direction is formed at the upper end 110, and the ball stud of the ball joint 111 is fixedly attached to the hole 96o of the ball joint coupling portion 96s of the clamp member 96.

In a case in which the wheel on one side in the vehicle width direction passes over a road level difference and the wheel on the other side in the vehicle width direction rolls on a stepless road surface, so that the electric vehicle tilts to the left and right in the vehicle width direction (rolling), the stabilizer 104 and the pair of stabilizer links 108 transmit the expansion and contraction of the strut 76 of the one side in the vehicle width direction to the strut 76 of the other side in the vehicle width direction. Therefore, the road level difference on the one side in the vehicle width direction is received by the struts 76 of both sides in the vehicle width direction to reduce rolling.

Although the embodiments of the present invention have been described with reference to the drawings, the present invention is not limited to the embodiments illustrated in the drawings. Various modifications and variations can be made to the illustrated embodiments within the same scope as the present invention or within an equivalent scope to that of the present invention.

INDUSTRIAL APPLICABILITY

The in-wheel motor power line wiring structure according to the present invention is advantageously available in electric vehicles and hybrid vehicles.

REFERENCE SIGNS LIST 10 in-wheel motor drive device
21 motor unit
25c signal line terminal box
25f radiation fin
25v motor casing cover
70 suspension device
76 strut
76c lower end portion
76d damper bracket
76e in-wheel motor coupling portion
77 shock absorber (damper)
77b rod
77c shaft portion
78 spring
79c lower coil spring seat
93 power line
93b wheel vicinity region
93d in-wheel motor drive device side region
96 clamp member
96a round hole
96b, 96g bolt
96c, 96d base member
96e block
96f wall member
96j slit
96l collar portion
96m wide groove
96p end wall portion
96r elongated hole
96s ball joint coupling portion
96t claw
96v hemicylindrical recess portion
96y female screw hole
96z one end surface
101 vehicle body
104 stabilizer
105 both ends
107, 111 ball joint
108 stabilizer link
K steering axis
T tire
W road wheel
Wr rim portion

The invention claimed is:
1. An in-wheel motor power line wiring structure comprising:
an in-wheel motor drive device configured to drive a wheel;
a damper including an upper end portion and a lower end portion, the upper end portion being coupled to a vehicle-body-side member, the lower end portion being directly and fixedly coupled to the in-wheel motor drive device;
a power line extending from the in-wheel motor drive device to a vehicle body; and
a clamp member that is provided on the lower end portion of the damper and configured to hold an intermediate portion of the power line.

2. The in-wheel motor power line wiring structure according to claim 1, wherein the damper is included in a strut that extends in a vertical direction and that is elastic in the vertical direction, the damper being configured to attenuate expansion and contraction of the strut.

3. The in-wheel motor power line wiring structure according to claim 2, wherein the in-wheel motor drive device is steerable around a steering axis that extends in the vertical direction to intersect an upper end portion of the strut.

4. The in-wheel motor power line wiring structure according to claim 3, wherein the clamp member includes an elastic member surrounding an outer periphery of the power line.

5. The in-wheel motor power line wiring structure according to claim 4, wherein the elastic member is a block having a plurality of through holes through which a plurality of the power lines are respectively passed.

6. The in-wheel motor power line wiring structure according to claim 4, wherein
the clamp member includes
a pair of base members configured to hold the lower end portion of the damper, and
a metallic wall member including a pair of end wall portions opposed to each other in a horizontal direction, and an intermediate wall portion extending in the horizontal direction from one of the end wall portions to another of the end wall portions such that the pair of end wall portions are attached to the base member and restrain the elastic member so as to hold side surfaces of the elastic member.

7. The in-wheel motor power line wiring structure according to claim 2, wherein the clamp member is disposed to be superimposed on a wheel rim of the wheel as seen in an axle direction of the wheel.

8. The in-wheel motor power line wiring structure according to claim 3, wherein the clamp member is disposed to be superimposed on the steering axis as seen in an axle direction of the wheel.

9. The in-wheel motor power line wiring structure according to claim 1, wherein
the lower end portion of the damper includes a shaft portion and a damper bracket that is fixedly attached to the shaft portion to extend downward from the shaft portion and that includes an in-wheel motor coupling portion for being coupled to the in-wheel motor drive device, and
the clamp member is provided on the shaft portion.

10. The in-wheel motor power line wiring structure according to claim 1, wherein
the power line includes a first region that extends in the vertical direction to be connected to a side of the in-wheel motor drive device at a lower portion and to be connected to the vehicle-body side at an upper portion, and a second region that extends in the vertical direction to be connected to the side of the in-wheel motor drive device at an upper portion and to be connected to the vehicle-body side at a lower portion, and the clamp member holds the first region and the second region.

11. The in-wheel motor power line wiring structure according to claim 1, wherein
a plurality of the in-wheel motor drive devices, a plurality of the dampers, a plurality of the power lines, and a plurality of the clamp members are respectively disposed on both sides of the vehicle body in a vehicle width direction,
the in-wheel motor power line wiring structure further comprises:
a stabilizer that extends from one side to another side of the vehicle body in the vehicle width direction; and
a pair of stabilizer links that are respectively disposed on both sides of the vehicle body in the vehicle width direction, and
one end of each of the stabilizer links is coupled to an end of the stabilizer and another end of each of the stabilizer links is coupled to the clamp member.

12. An in-wheel motor drive device comprising:
a wheel hub that is coupled to a wheel;
a motor unit including a motor rotation shaft that drives the wheel hub, a casing that forms an outer shell, and a power line connecting portion that is provided on the casing; and
a flexible power line whose one end is connected to the power line connecting portion, whose the other end extends to a vehicle body outside the casing, and that supplies electric power from the vehicle body to the motor unit, wherein
the in-wheel motor drive device is directly and fixedly coupled to a lower end portion of a damper extending in a vertical direction, and
an intermediate portion of the power line is held by a clamp member that is provided on the lower end portion of the damper.

\* \* \* \* \*